(12) United States Patent
Otero et al.

(10) Patent No.: US 10,229,101 B2
(45) Date of Patent: Mar. 12, 2019

(54) SMART FILL

(71) Applicant: MICROSOFT TECHNOLOGY LICENSING, LLC, Redmond, WA (US)

(72) Inventors: Carlos Augusto Otero, Seattle, WA (US); John Campbell, Renton, WA (US); Uhl Albert, Kirkland, WA (US); Daniel Parish, Bellevue, WA (US); Aaron Lamar Wilson, Seattle, WA (US); Steve Tullis, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 279 days.

(21) Appl. No.: 13/918,878

(22) Filed: Jun. 14, 2013

(65) Prior Publication Data

US 2014/0372857 A1    Dec. 18, 2014

(51) Int. Cl.
*G06F 17/00* (2006.01)
*G06F 17/24* (2006.01)
(Continued)

(52) U.S. Cl.
CPC ........ *G06F 17/246* (2013.01); *G06F 3/04842* (2013.01); *G06F 3/04845* (2013.01); *G06F 9/453* (2018.02); *G06F 17/243* (2013.01)

(58) Field of Classification Search
CPC . G06F 17/246; G06F 17/243; G06F 17/30985
See application file for complete search history.

(56) References Cited

U.S. PATENT DOCUMENTS 5,231,577 A   7/1993  Koss
5,598,519 A   1/1997  Narayanan
(Continued)

FOREIGN PATENT DOCUMENTS

CN   1664810 A    9/2005
CN   1696937 A   11/2005
(Continued)

OTHER PUBLICATIONS

Eager, A., et al.; Lixto Online Market Intelligence—Published Jul. 2008; http://www.lixto.com/wp-content/uploads/2010/03/Butler_TechnologyAudit_2008.pdf; 9 pgs.
(Continued)

*Primary Examiner* — Howard Cortes
(74) *Attorney, Agent, or Firm* — Merchant & Gould

(57) ABSTRACT

A smart fill feature is provided, which may be utilized to provide suggestions to a user and to prepopulate fill results in a spreadsheet. Characteristics associated with a set of data may be recognized and used to help determine fill results. Suggestions may be determined from internal and or/external data sources, and may use contextual information in a data set to determine what a user may be trying to accomplish. External data sources may include one or more Internet data sources or internal corporate databases, providing a large amount of data from which to search for potential fill results. A split column command may be used to split a column into two or more columns. Data may be split between columns or combined by various methods, which may include, by example, by direct manipulation via tokens, or via a slider UI.

20 Claims, 35 Drawing Sheets

(51) Int. Cl.
  *G06F 3/0484* (2013.01)
  *G06F 9/451* (2018.01)

(56) References Cited

U.S. PATENT DOCUMENTS

| | | |
|---|---|---|
| 5,613,131 A | 3/1997 | Moss |
| 5,621,875 A | 4/1997 | Mason et al. |
| 5,701,499 A | 12/1997 | Capson et al. |
| 5,778,402 A | 7/1998 | Gipson |
| 5,805,158 A | 9/1998 | Bertram |
| 6,038,567 A | 3/2000 | Young |
| 6,640,234 B1 | 10/2003 | Coffen |
| 6,662,340 B2 | 12/2003 | Rawat et al. |
| 6,697,999 B1 | 2/2004 | Breuer |
| 7,222,294 B2 | 5/2007 | Coffen |
| 7,305,129 B2 | 12/2007 | Chellapilla |
| 7,343,551 B1 | 3/2008 | Bourdev |
| 7,350,187 B1* | 3/2008 | Tong ............... G06F 17/276 707/999.002 |
| 7,426,496 B2 | 9/2008 | Kristjansson |
| 7,640,158 B2 | 12/2009 | Detlef |
| 7,689,904 B2 | 3/2010 | Ritter |
| 7,707,486 B2 | 4/2010 | Genesereth |
| 7,827,483 B2 | 11/2010 | Unbedecht |
| 8,140,533 B1* | 3/2012 | Elmeleegy ........ G06F 17/30569 707/737 |
| 8,286,072 B2 | 10/2012 | Chamberlain |
| 8,510,373 B2 | 8/2013 | Demant et al. |
| 8,600,916 B2* | 12/2013 | Chen ............... G06Q 10/10 706/14 |
| 8,645,825 B1* | 2/2014 | Cornea ............... G06F 17/3064 715/257 |
| 8,819,574 B2* | 8/2014 | Ouyang ............... G06F 3/0482 715/773 |
| 2001/0018696 A1 | 8/2001 | Hori et al. |
| 2002/0103825 A1 | 8/2002 | Bauchot |
| 2003/0037033 A1 | 2/2003 | Nyman et al. |
| 2004/0060001 A1 | 3/2004 | Coffen |
| 2005/0132280 A1 | 6/2005 | Broman et al. |
| 2006/0007466 A1 | 1/2006 | Ben-Yehuda et al. |
| 2006/0074866 A1 | 4/2006 | Chamberlain et al. |
| 2006/0080594 A1 | 4/2006 | Chavoustie |
| 2006/0136808 A1 | 6/2006 | Chirilov |
| 2007/0078872 A1* | 4/2007 | Cohen ............... G06F 17/30696 |
| 2007/0101252 A1 | 5/2007 | Chamberlain |
| 2007/0106494 A1 | 5/2007 | Detlef |
| 2007/0130263 A1 | 6/2007 | Li et al. |
| 2007/0220415 A1 | 9/2007 | Cheng et al. |
| 2007/0250765 A1* | 10/2007 | Chen ............... G06F 17/246 715/234 |
| 2008/0114758 A1* | 5/2008 | Rupp ............... G06F 17/30867 |
| 2009/0089653 A1 | 4/2009 | Campbell et al. |
| 2009/0319542 A1 | 12/2009 | Le Brazidec et al. |
| 2010/0083086 A1 | 4/2010 | Berger |
| 2010/0122152 A1 | 5/2010 | Chamberlain et al. |
| 2010/0257145 A1 | 10/2010 | Felsheim |
| 2010/0257444 A1 | 10/2010 | Bever et al. |
| 2010/0325173 A1* | 12/2010 | Haley ............... G06F 17/30604 707/804 |
| 2011/0010324 A1* | 1/2011 | Bolivar ............... G06N 5/02 706/46 |
| 2011/0066933 A1 | 3/2011 | Ludwig |
| 2011/0209048 A1 | 8/2011 | Scott |
| 2011/0320230 A1 | 12/2011 | Podgurny |
| 2012/0192051 A1 | 7/2012 | Rothschiller |
| 2013/0124962 A1 | 5/2013 | Mitchell |
| 2013/0151939 A1* | 6/2013 | Proux ............... G06F 17/246 715/212 |
| 2013/0191714 A1 | 7/2013 | Rothschiller |
| 2013/0227031 A1* | 8/2013 | Wells ............... H04M 1/274558 709/206 |
| 2014/0188925 A1* | 7/2014 | Skolicki ............... H04N 21/4622 707/765 |
| 2016/0275066 A1 | 9/2016 | Otero et al. |

FOREIGN PATENT DOCUMENTS

| | | |
|---|---|---|
| CN | 101105814 A | 1/2008 |
| CN | 101158900 A | 4/2008 |
| CN | 101661512 A | 3/2010 |
| CN | 102968468 A | 3/2013 |
| EP | 2506155 A1 | 10/2012 |
| JP | 2004536369 A | 12/2004 |
| JP | 2006092520 A | 4/2006 |
| JP | 2009515253 A | 4/2009 |
| JP | 2009524174 A | 6/2009 |
| RU | 2439683 C2 | 1/2012 |
| TW | 498221 B | 8/2002 |
| TW | 561371 B | 11/2003 |
| TW | 200629146 A | 8/2006 |
| TW | 200939052 A | 9/2009 |
| WO | 02065330 A1 | 8/2002 |

OTHER PUBLICATIONS

French, T., et al.; Excel 2007 AutoFormat—Retrieved Date: Oct. 19, 2010; About.com; http://spreadsheets.about.com/od/excelformatting/qt/090905-excel-autoformat.htm; 2 pgs.

Greathouse, Jim, "Combining and Splitting Data in Spreadsheets—Google Tech Tips", Published on: Nov. 17, 2011, Available at: https://sites.google.com/a/slu.edu/tips/home/combiningandsplittingdatainspreadsheets.

Gulwani, S.; Automating String Processing in Spreadsheets Using Input-Output Examples; Microsoft Research, Redmond, WA, USA; PoPL'11; Jan. 26-28, 2011, Austin, TX, USA; 13 pgs.

Igarashi, et al., "Fluid Visualization of Spreadsheet Structures", in Proceedings of the IEEE Symposium on Visual Languages, Sep. 1998, pp. 118-125.

International Search Report dated Jul. 27, 2012, in Appl. No. PCT/US2012/022454.

"International Search Report and Written Opinion Issued in PCT Application No. PCT/US2014/040202", dated May 29, 2015, 14 Pages.

Leete, Mary, "Free Software: Autofilling Cells in OpenOffice.org Calc", Retrieved on: Nov. 9, 2011, Available at: http://www.dummies.com/how-to/content/free-software-autofilling-cells-in-openofficeorg-c.html.

Lowell, Heddings, "How to Use AutoFill on a Google Docs Spreadsheet", Published on: Apr. 28, 2010, Available at: http://www.howtogeek.com/howto/15799/how-to-use-autofill-on-a-google-docs-spreadsheet-quick-tips.

Microsoft; Use automatic formatting as you type—Retrieved Date: Oct. 19, 2010; http://office.microsoft.com/en-in/excel-help/use-automatic-formatting-as-you-type-HP010082297.aspx?CTT=3; 3 pgs.

Oracle.com; 21 Data Cleansing and Correction with Data Rules—Retrieved Date: Oct. 19, 2010; http://download.oracle.com/docs/cd/E11882_01/owb.112/e10935/data_cleansing.htm#CEGBEBDE; 10 pgs.

Rad, S.; Conditional Formatting Rules Simplified—Published Date: Apr. 22, 2010; http://blogs.msdn.com/b/excel/archive/2010/04/22/conditional-formatting-rules-simplified.aspx; 7 pgs.

Stinson, et al., "Working with External Data", in Book-Microsoft Office Excel 2003 Inside Out, Chapter 29, Jan. 1, 2004, pp. 757-763.

"Visualizing Data Using Conditional Formatting", in Excel 2007 Bible, 2007, 3 Pages.

Walkenbach, Excel 2007 Bible, 2007, Wiley Publishing Inc., pp. 421-440.

Office Action dated Jun. 26, 2012, in U.S. Appl. No. 13/014,520.
Office Action dated Dec. 11, 2012, in U.S. Appl. No. 13/014,520.
Office Action dated Aug. 14, 2013, in U.S. Appl. No. 13/014,520.
Office Action dated Jan. 9, 2014, in U.S. Appl. No. 13/358,033.
Office Action dated Sep. 12, 2014, in U.S. Appl. No. 13/358,033.
Office Action dated Jan. 30, 2015, in U.S. Appl. No. 13/014,520.
Office Action dated Apr. 8, 2015, in U.S. Appl. No. 13/358,033.
Office Action dated Dec. 4, 2013, issued in CN Appl. No. 201210019215.9, w/translation.

(56) References Cited

OTHER PUBLICATIONS

"First Examination Report Received in New Zealand Patent Application No. 613143", dated Mar. 7, 2014, Filed Date: Jan. 24, 2012, 2 Pages.
"Office Action and Search Report Issued in Taiwan Patent Application No. 100149580", dated Apr. 29, 2014, 12 Pages.
"Office Action Issued in Taiwan Patent Application No. 100149580", dated Sep. 18, 2014, 7 Pages.
"Second Office Action Issued in Chinese Patent Application No. 201210019215.9", dated Jul. 22, 2014, 10 Pages.
"Office Action Issued in Philippines Patent Application No. PH/1/2013/501506", dated Aug. 19, 2014, 2 Pages.
"Office Action Issued in Chile Patent Application No. 2093-2013", dated Mar. 13, 2015, 5 Pages. (w/o English Translation).
Office Action issued in Columbia Patent Application No. 13-176231, dated Jul. 9, 2014, 6 pages.
Notice of Allowance issued in Columbia Patent Application No. 13-176231, dated Oct. 22, 2014, 3 pages.
Notice of Allowance issued in Chinese Patent Application No. 201210019215.9, dated Feb. 3, 2015, 6 pages.
Notification Prior to Examination issued in Israeli Patent Application No. 227218, dated Jun. 8, 2015, 3 pages.
Haliestinson, "Flash-Fill in Microsoft Excel 2013", Published on: Apr. 16, 2013, Available at: http://blog.directionstraining.com/microsoft-excel/flash-fill-in-microsoft-excel-2013, 4, pgs.
Mott, Elizabeth, "How to Auto Populate the Date in Excel", Retrieved on: Apr. 26, 2013, Available at: http://smallbusiness.chron.com/auto-populate-date-excel-40253.html, 3, pgs.
"Excel Functions", Published on: Apr. 10, 2008, Available at: http://www.baycongroup.com/excel2007/03_excel.htm, 11, pgs.
Hanns, Susan, "Tips for Populating Cells in Excel Using Auto Fill", Published on: Jul. 14, 2011, Available at: http://ittrainingtips.iu.edu/excel/tips-for-populating-cells-in-excel-using-auto-fill/07/2011, 2, pgs.
Nangpooh, "MS Excel Tutorial—Creating Custom Lists to Auto Fill Rows and Columns", Published on: Mar. 14, 2013, Available at: http://valvossa.info/?p=26, 4, pgs.
"Using Excel's Autofill", Published on: Apr. 7, 2013, Available at: http://askaexcelninja.wordpress.com/2013/04/07/using-excels-autofill/, 3, pgs.
Office Action dated Dec. 18, 2015, in U.S. Appl. No. 13/358,033.
"Office Action Issued in Russian Patent Application No. 2013135003", dated Nov. 30, 2015, 5 Pages. (w/o English Translation).
"International Preliminary Report on Patentability Issued in PCT Application No. PCT/US2014/040202", dated Jan. 18, 2016, 8 Pages.
"Check Out New Functions of Office 2000", I've Got It! Office 2000, Nikkei BP Soft Press, Japan, May 1, 1999, pp. 82-90. (W/o English Translation).
"Office Action Issued in Japanese Patent Application No. 2013-551298", dated Feb. 29, 2016, 8 Pages.
"Office Action Issued in Israel Patent Application No. 227218", dated Feb. 14, 2016, 2 Pages.
Office Action dated Oct. 8, 2015, in U.S. Appl. No. 13/014,520.
"Office Action Issued in Chile Patent Application No. 201302093", dated Oct. 14, 2015, 5 Pages. (w/o English Translation).
"Office Action Issued in New Zealand Patent Application No. 711979", dated Sep. 21, 2015, 2 Pages.
"Second Written Opinion Issued in PCT Application No. PCT/US2014/040202", dated Nov. 19, 2015, 7 Pages.
Australian First Office Action Issued in Patent Application No. 2012209157, dated May 5, 2016, 2 Pages.
Israel Notice of Allowance Issued in Israel Patent Application No. 227218, dated Jul. 4, 2016, 6 Pages.

Philippines Office Action Issued in Philippines Patent Application No. PH/1/2013/501506, dated May 5, 2016, 3 Pages.
Russian Notice of Allowance Issued in Russian Patent Application No. 2013135003, dated Jun. 27, 2016, 10 Pages. (w/o English Translation).
Australian Notice of Allowance Issued in Patent Application No. 2012209157, dated Jul. 7, 2016, 3 Pages.
Japanese Notice of allowance Issued in Patent Application No. 2013-551298, dated Sep. 26, 2016, without English Tramslation 3 Pages.
Russian Notice of Allowance Issued in Russian Patent Application No. 2013135003, dated Jun. 27, 2016, 16 Pages. (With English Translation).
U.S. Appl. No. 13/358,033, Office Action dated Sep. 13, 2016. 25 pages.
New Zealand Notice of allowance Issued in New Zealand Patent Application No. 711979, dated Mar. 7, 2017, 1 Page.
Taiwan Notice of allowance Issued in Taiwan Patent Application No. 100149580, dated Dec. 28, 2016, 4 Pages. With english trans.
U.S. Appl. No. 13/014,520, Office Action dated Jan. 12, 2017, 33 pages.
U.S. Appl. No. 13/358,033, Office Action dated Mar. 28, 2017. 21 pages.
"Office Action issued in Canadian Patent Application No. 2,824,922", dated Dec. 8, 2017, 4 Pages.
"Extended European Search Report in Patent Application No. 12739249.6", dated Jan. 4, 2018, 8 Pages.
U.S. Appl. No. 13/014,520, Office Action dated Jul. 12, 2017, 21 pages.
U.S. Appl. No. 13/358,033, Office Action dated Sep. 11, 2017, 19 pages.
Chinese First Office Action dated Aug. 2, 2017, issued in CN Appl. No. 201480045301.4, 5pgs. w/translation.
U.S. Appl. No. 15/171,895, Office Action dated Sep. 11, 2017, 21 pages.
Gregory, Text to Columns in Excel, Jul. 13, 2010, Excel Semi-Pro, pp. 1-5. Retrieved: http://excelsemipro.com/2010/07/text-to-columns-in-excel/.
Office Action Issued in Malaysian Patent Application No. PI2013701301, dated Aug. 15, 2017, 3 Pages.
Notice of Allowance Issued in Malaysian Patent Application No. PI2013701301, dated Mar. 30, 2018, 2 Pages.
U.S. Appl. No. 13/014,520, Office Action dated Mar. 8, 2018, 8 pages.
Lowell, Heddings, "Using Conditional Cell Formatting in Excel 2007", Published on: Aug. 18, 2008, Available at: https://www.howtogeek.com/howto/microsoft-office/using-conditional-cell-formatting-in-excel-2007/.
U.S. Appl. No. 13/358,033, Office Action dated Mar. 16, 2018, 21 pages.
U.S. Appl. No. 15/171,895, Notice of Allowance dated Feb. 22, 2018, 5 pages.
"Office Action Issued in Korean Patent Application No. 1020137019749", dated May 13, 2018, 6 Pages.
"Office Action Issued in Chinese Patent Application No. 201480045301A", dated Jun. 20, 2018, 13 Pages.
"Office Action Issued in Argentina Patent Application No. P120100249", dated Jul. 25, 2017, 5 Pages.
"Office Action Issued in Korean Patent Application No. 10-2013-7019749", dated Nov. 27, 2018, 6 Pages.
"Non Final Office Action Issued in U.S. Appl. No. 13/358,033", dated Oct. 4, 2018, 20 Pages.

\* cited by examiner

Book 1 — File Home Insert Page Layout Formulas Data Review View

| | A | B | C | D | E | F | G |
|---|---|---|---|---|---|---|---|
| 1 | | | | | | | |
| 2 | | Obama | 2009-present | | | | |
| 3 | | Bush | 2001- | | | | |
| 4 | | Clinton | | | | | |
| 5 | | Bush | | 205 | | | |
| 6 | | Reagan | | | | | |
| 7 | | Carter | | | | | |
| 8 | | Ford | | | | | |
| 9 | | Nixon | | | | | |
| 10 | | Johnson | | | | | |
| 11 | | Kennedy | | | | | |

Sheet 1 | Sheet 2

| | A | B | C | D | E |
|---|---|---|---|---|---|
| 1 | | | Major | Year | GPA |
| 2 | John Adamson | | Environmental Studies | Freshman | 4.0 |
| 3 | Bob Brown | | Biology | Sophomore | 1.7 |
| 4 | Ed Carter | | Psychology | Junior | 2.3 |
| 5 | Gina Davis | | cs | Junior | 1.3 |
| 6 | Ann Edwards | | | Senior | 3.0 |
| 7 | Rick Farmer | | gy | Freshman | 3.4 |
| 8 | Amy Garner | | Geology | Sophomore | 3.3 |
| 9 | Peter Howard | | Chemistry | Junior | 2.0 |
| 10 | Sarah Jones | | | Senior | 3.0 |
| 11 | Jennifer Lane | | Environmental Studies | Senior | 3.5 |

510: Enter the text that you want in this column.
You may need to enter a few rows before we can figure out what you want.

FIG. 5D

|    | A | B | 515 | C | 502C D | 502D E |
|----|---|---|---|---|---|---|
|    | 502A | 502E 502B | | | | GPA |
|    | | Last | | Major | Year | |
| 1  | | | | | | |
| 2  | John | Adamson | | Environmental Studies | Freshman | 4.0 |
| 3  | Bob | Brown | | Biology | Sophomore | 1.7 |
| 4  | Ed | Carter | | Psychology | Junior | 2.3 |
| 5  | Gina | Davis | | Mathematics | Junior | 1.3 |
| 6  | Ann | Edwards | | English | Senior | 3.0 |
| 7  | Rick | Farmer | | Physics | Freshman | 3.4 |
| 8  | Amy | Garner | | Anthropology | Sophomore | 3.3 |
| 9  | Peter | Howard | | Geology | Junior | 2.0 |
| 10 | Sarah | Jones | | Chemistry | Senior | 3.0 |
| 11 | Jennifer | Lane | | Environmental Studies | Senior | 3.5 |

FIG. 5F

| | A | B 502E | 502B | C | 502C D | 502D E |
|---|---|---|---|---|---|---|
| | Name 502A | Last Name | Major | | Year | GPA |
| 1 | | | | | | |
| 2 | John | Adamson | Environmental Studies | | Freshman | 4.0 |
| 3 | Bob | Brown | Biology | | Sophomore | 1.7 |
| 4 | Ed | Carter | Psychology | | Junior | 2.3 |
| 5 | Gina | Davis | Mathematics | | Junior | 1.3 |
| 6 | Ann | Edwards | English | | Senior | 3.0 |
| 7 | Rick | Farmer | Physics | | Freshman | 3.4 |
| 8 | Amy | Garner | Anthropology | | Sophomore | 3.3 |
| 9 | Peter | Howard | Geology | | Junior | 2.0 |
| 10 | Sarah | Jones | Chemistry | | Senior | 3.0 |
| 11 | Jennifer | Lane | Environmental Studies | | Senior | 3.5 |

SMART FILL

BACKGROUND

With the advent of spreadsheet applications, computer and computer software users have become accustomed to processing and manipulating enormous amounts of data and using spreadsheet functions to perform many simple to very complex calculations and organizational functions with their data. Typical spreadsheet solutions provide a grid made up of rows and columns for receiving and manipulating data. Current spreadsheet solutions may include a fill handle operable to fill series (e.g., number series, days of the week, months, etc.) and fill copy (e.g., copying fixed sets of data, copying functions with self-adjusting cell references, etc.), and allowing users to save time by not needing to repeatedly type in data in certain scenarios.

As more and more computers with touch interfaces are being provided, automated data entry solutions may be of even greater advantage to users, as it is generally more difficult to type via a touchscreen, and soft keyboards can sometimes cover up to half of a screen. Current fill handle designs may not be very discoverable; and therefore, many users may not enjoy the benefits of fill series and fill copy. Additionally, current fill handle designs may not be optimal for touch input. Current designs may also not leverage the rich data store of information available in external data sources and on the Internet to identify patterns and to provide suggestions for fill results. A way of recognizing partial series of data and automatically and contextually offering suggested data to complete the series and/or a way of recognizing an editing pattern applied one or more items in a series and automatically and contextually offering the user the option to apply the pattern to the remaining items in the series would be an improvement providing a technical advantage over the current state of the art because it would improve the efficiency of the user in creating and editing spreadsheets and reduce the amount of typing required, especially when using touch based user interfaces.

It is with respect to these and other considerations that the present invention has been made. Although relatively specific problems have been discussed, it should be understood that the embodiments disclosed herein should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments described in the present disclosure provide a smart fill feature, which may provide suggestions to a user and prepopulate fill results in a spreadsheet without requiring direct use of a fill handle or a keyboard. Suggestions for fill results may be discovered by detecting possible series patterns, and determining possible results to add to or complete the series pattern. Outer limits, a shape, characteristics, and size of a set of data may be recognized when determining fill results. Suggestions may be determined from internal and or/external data sources, and may use contextual information in a data set to determine what a user may be trying to accomplish. Embodiments of the present invention provide for searching external data sources for series patterns and for additional data to add to a detected series. A spreadsheet application may connect to a service, such as a web search engine, an internal server, a corporate partner's server, etc. for accessing large amount of data for providing smart results for fill results. Connecting the plethora of information available on the Internet and on other external data sources to a spreadsheet may enable users of spreadsheets to bring information into their natural workflow. When suggested fill results are provided, a user may commit the results, and accordingly, the suggestions may be added to the spreadsheet.

Embodiments may also comprise splitting or combining data in place by various methods which may include, but are not limited to, by example, by direct manipulation via tokens, via a slider UI, etc. Patterns from a user may be recorded and used as future potential fill data for suggestions.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIGS. 2A-2E illustrate an example of providing an auto-suggestion of fill results for a selected series of data;

FIGS. 4A-4B illustrate an example of recognizing an outer limit of a set of data and providing an autosuggestion of a series based on the recognized outer limit;

FIGS. 5A-5G illustrate an example of splitting data via example;

FIGS. 6A-6C illustrate another example of splitting data via example;

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation or an implementation combining software and hardware aspects. The following detailed description is, therefore, not to be taken in a limiting sense.

Figure 1:
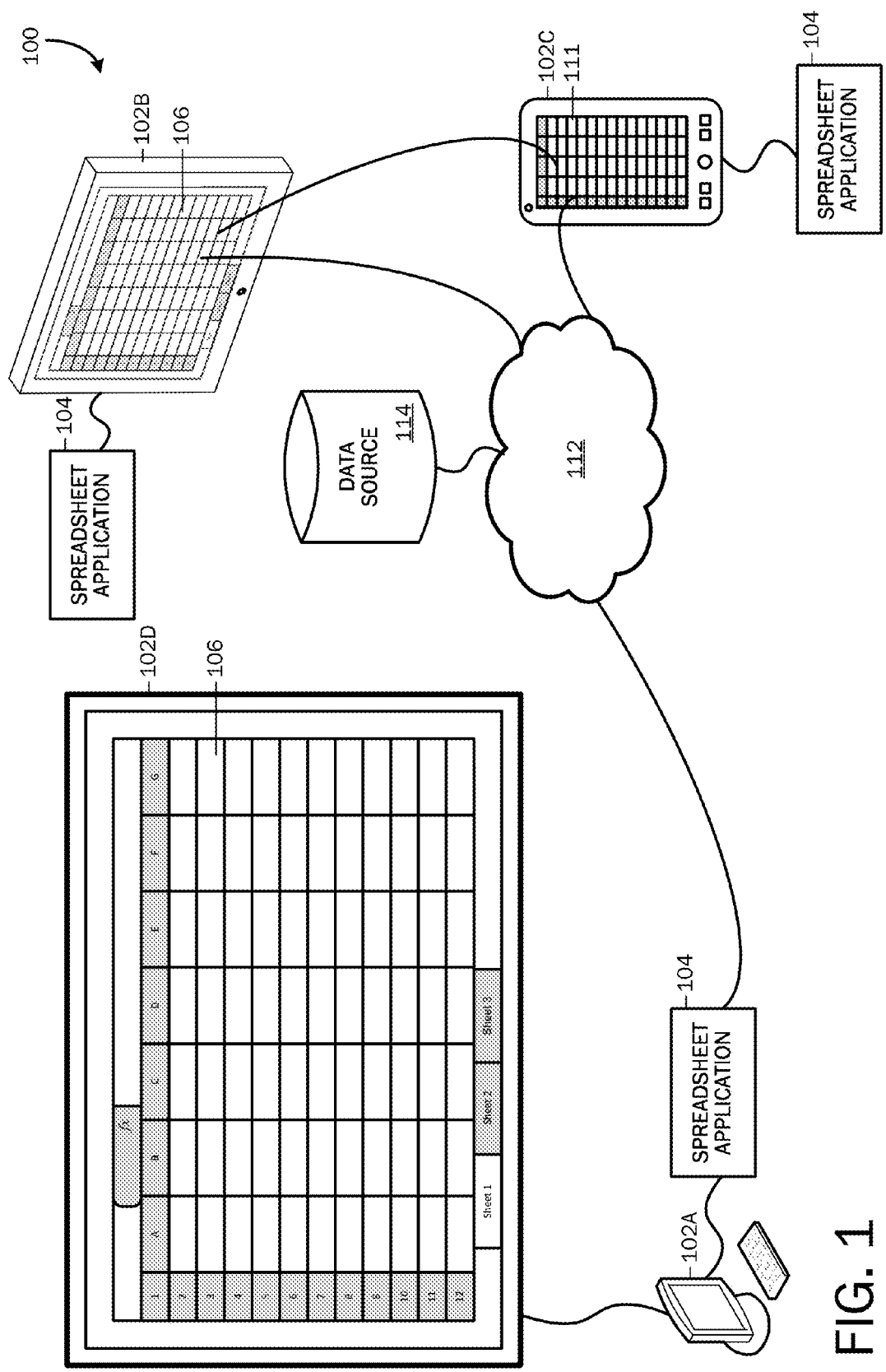
FIG. 1 illustrates a system architecture in which embodiments of the present invention may be practiced.

Embodiments of smart fill are described herein and illustrated in the accompanying figures. Smart fill may be provided in the context of a spreadsheet application on any device, service, or general endpoint capable of running the spreadsheet application. FIG. 1 illustrates a system architecture in which embodiments of the present invention may be practiced. The system 100 includes one or more computing devices such as a personal computer (e.g., a desktop or laptop computer) 102A, a tablet computer 102B, a smart phone 102C, and a large-scale display 102D. Each of the computing devices may run a spreadsheet application 104 for displaying and editing a spreadsheet 106. As should be appreciated, the computing devices 102 are for purposes of illustration only and are not exhaustive of the various types of computing devices that may be used in accordance with embodiments of the present invention. For example, while the large-scale display 102D is illustrated as a display unit with an associated computing device 102A, the large-form display device 102D may operate as an integrated display/computing device that may be used for any suitable use from large-scale display uses, for example, in a conference room, to personal computing, as desired. According to embodiments, each of the computing devices 102 illustrated in FIG. 1 may receive input through a variety of suitable means including touch or gesture input, keyboard input, mouse input, voice command input, electronic inking input, and the like.

Referring still to FIG. 1, the spreadsheet applications 104 illustrated in association with each of the computing devices 102 are illustrative of spreadsheet application 104 having sufficient computer executable instructions for enabling embodiments of the present invention as described herein. An example spreadsheet application 104 includes Excel® manufactured by Microsoft Corporation of Redmond, Wash. As should be appreciated, this is but one example spreadsheet application 104, and any other application suitable for enabling embodiments described herein may be used.

According to embodiments, application functionality associated with each of the computing devices 102 may operate according to one or more variations. For example, each application 102 may be a fully functional "thick" client application having all application functionality including the ability to send and receive data to and from other applications 102 operating on other computing devices in the collaborative work session. According to another embodiment, the computing devices 102 may communicate via a distributed computing network 112, for example, the Internet. An Internet-based or "cloud-based" server computer may be operate one or more web services applications for providing a collaborative work session. According to this embodiment, each of the devices 102 may operate as thin client systems, and collaborative communication between the devices may be operated at the direction of the web services application operated at a remote site. According to this embodiment, a spreadsheet application 104 may operate at the remote server wherein each of the devices 102 may access and receive the functionality described herein via a remote service from the server based application, for example, via the web services application. The illustrated embodiment also shows an external data source 114 that may be linked to and provide data to the spreadsheet 106.

As described briefly above, while a fill handle allows users to save time by not needing to repeatedly type in data in certain scenarios, current fill handle implementations may not be very discoverable, and may not be optimally designed for touch input. Additionally, current fill handle implementations may not leverage the plethora of information available on the Internet to discover potential patterns and to provide suggestions for completing discovered patterns of data.

Embodiments of the present invention provide a smart fill feature, which may provide suggestions to a user and prepopulate fill results in a spreadsheet 106 without requiring direct use of a fill handle or a keyboard. FIGS. 2A-8C described below show example spreadsheet application user interfaces with which smart fill may be provided, as described herein. As should be appreciated, the example user interfaces described below may be displayed on any suitable computing device 102, described above with reference to FIG. 1. In addition, as should be appreciated, user interaction with the described user interfaces may be performed according to any suitable interaction means, including touch interaction, gesture interaction, keyboard interaction, mouse interaction, voice command interaction, or a combination thereof.

Figure 2A:
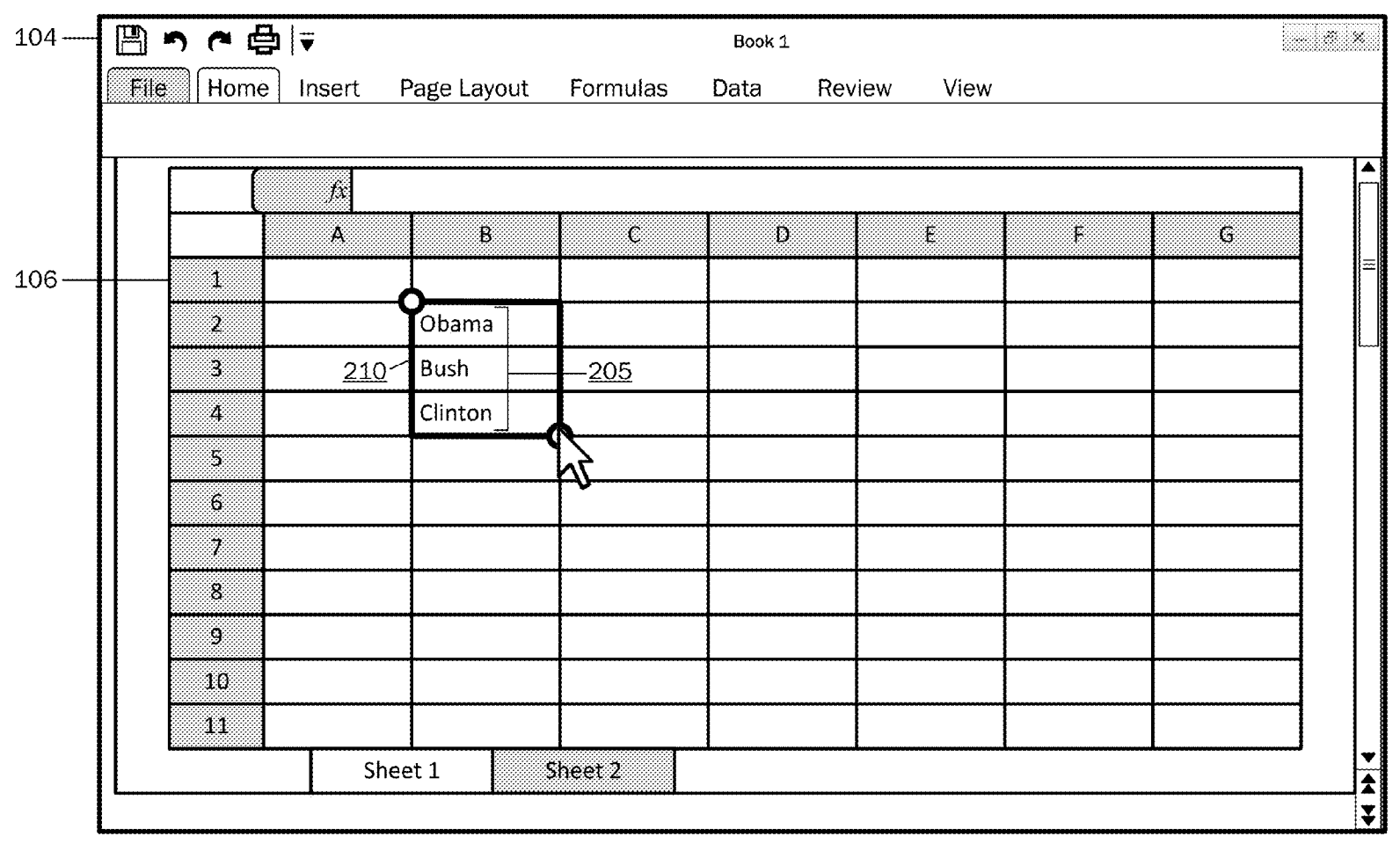
Figure 2B:
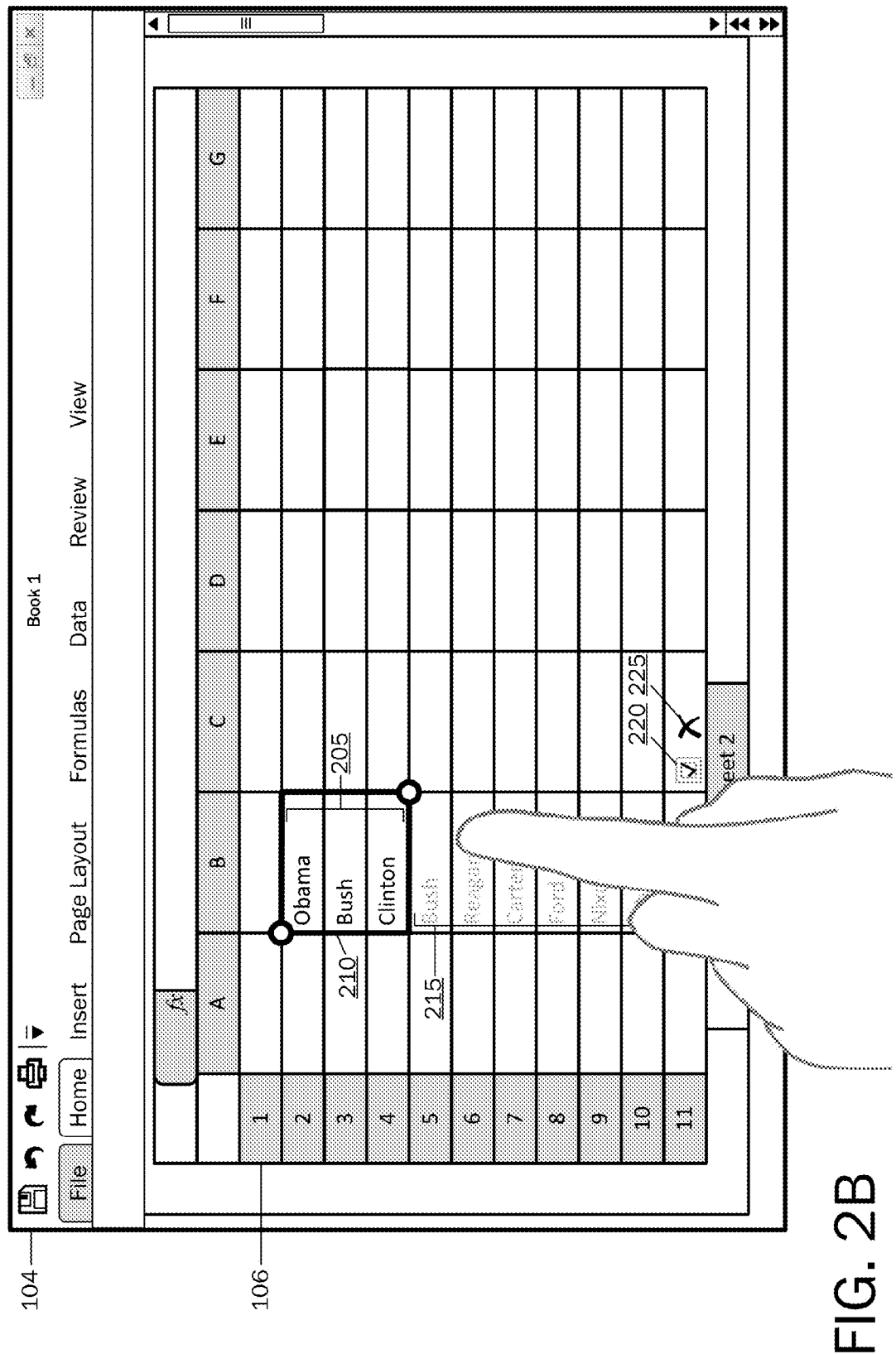

FIGS. 2A-E illustrate one embodiment of a sequence of steps for providing an autosuggestion of data according to a pattern. Referring now to FIG. 2A, a spreadsheet 106 is shown displayed in a spreadsheet application 104 UI. The spreadsheet 106 may include a set of data 205, which may be input by a user or which may already exist in the spreadsheet 106. As illustrated, an example set of data 205 may include the text "Obama" in a first cell, the text "Bush" in a second cell, and the text "Clinton" in a third cell. According to embodiments, when a selection 210 of a set of data 205 is made (as illustrated in FIG. 2A), a determination may be made as to whether the data 205 in the selection 210 follows a series pattern. The determination may also include a recognition of outer limits, shape, characteristics, and size of a set of data 205, wherein a set of data may include a table, range of cells, etc. The data may be visible on the UI (e.g., a table), or may not be visible to the user (e.g., data in a database, web service, etc.).

As illustrated in FIG. 2B, if a series pattern is detected, an autosuggestion 215 of an extension to the detected series pattern may be displayed. As illustrated, suggested fill results (i.e., an autosuggestion 215) may be provided. For example, the set of data 205 may be determined to be a listing of United States presidents in reverse order. The determination may be made by searching one or more external data sources 114, for example, a service, such as a web search engine, for results including data 205 from the set of data 205. An autosuggestion 215 including one or more United States presidents in reverse order starting after "Clinton" may be provided. According to one embodiment, an autosuggestion 215 may be prepopulated into a spreadsheet 106, and may be displayed in such a way as to be distinguishable from data 205 in the spreadsheet. For example, an autosuggestion 215 may be displayed as "ghosted" or semi-transparent. Other alternatives may include a hovering of an autosuggestion 215 next to a cell, a fill scratchpad displayed in a task pane, a status bar, etc. As should be appreciated, these examples are not exhaustive of the various alternative ways an autosuggestion 215 may be displayed. According to an embodiment, detection of a pattern of data 205 and an autosuggestion 215 of an extension to the pattern may be made according to data 205 in the spreadsheet 106, or may be made according to external data, for example, data in one or more external data sources 114. An external data source 114 may include various types of data sources. For example, a data source 114 may include a third party service for providing data series fills that may be accessed via a network, 112, such as the Internet.

As another example, an external data source 114 may include an Internet entity store, which may be operable to recognize a series of data 205, search for data to add to or complete the series, and to provide the results to the requesting application (e.g., spreadsheet application 104). Recognition of a pattern or a series of data and a search for additional data may be comparable to a web search, wherein a search may be made in a web search engine or in one or more data sources 114 using data 205 entered into a spreadsheet 106. As an example, a set of data may include, "Breckenridge" in a first cell, and "Vail" in a next cell. The user may select the data 205 or alternatively, the data 205 may be automatically detected and utilized to search for possible series of data comprising the entered data. A search may be performed on the Internet or other data source 114 for "Breckenridge" and "Vail." For example, results may include a list of ski resorts in Colorado. Accordingly, the results may be displayed in the spreadsheet application 104 UI as an autosuggestion 215 of data.

Referring again to FIG. 2B, a commit UI control 220 and/or a dismiss UI control 225 may be provided. If the dismiss UI control 225 is selected, or if the user carries on with a different action (e.g., tapping somewhere in the spreadsheet outside of the autosuggestion 215, continuing to work in the spreadsheet as normal, etc.), the autosuggestion 215 may be removed from display. If the commit UI control 220 is selected, or if the autosuggestion 215 is selected (e.g., tapped, clicked on, etc.), the autosuggestion 215 may be inserted into the set of data 205 in the spreadsheet 106 as illustrated in FIG. 2C.

Figure 2D:
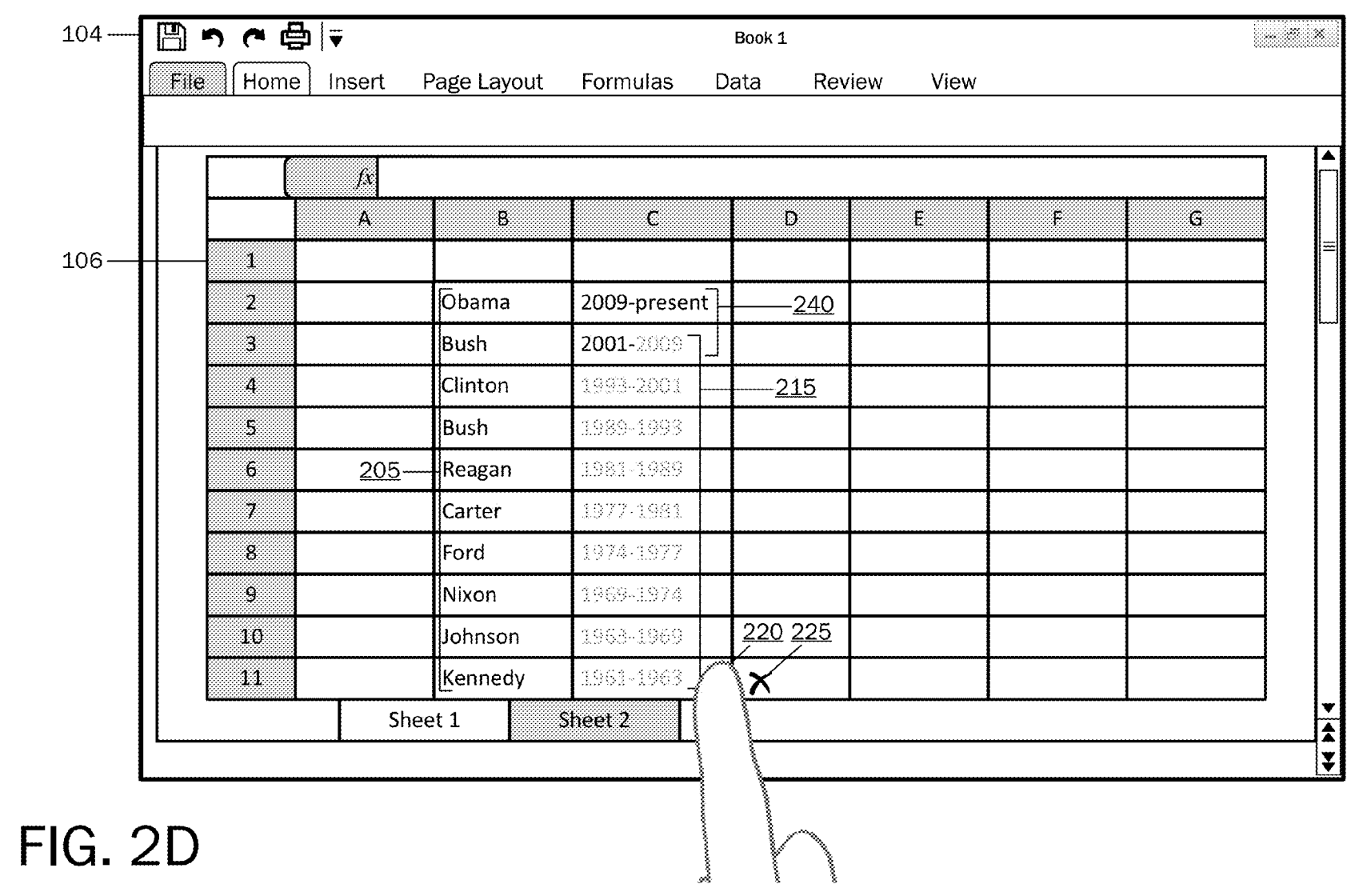
Figure 2E:
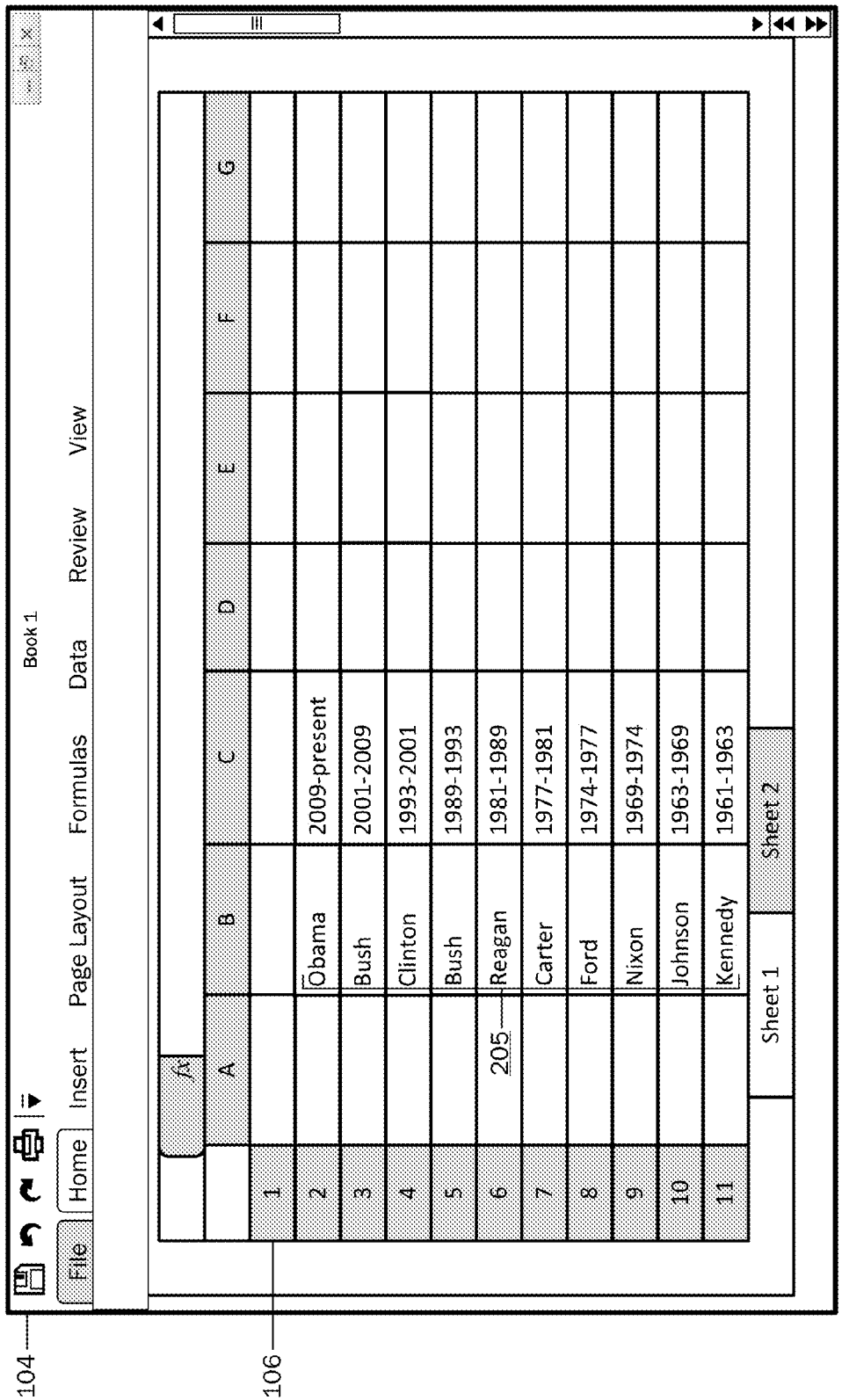

If a user enters additional data 240 in an adjacent cell, for example, he enters a date range in a cell adjacent to the cell where he entered "Obama," the data entered data 240 may be detected and related to data 205 in adjacent cells to search for potential series of data or patterns. After a search, which may include a search of an external data source 114, a determination may be made that the date range entered in the cell adjacent to "Obama" is the data range of the president's time in office. Accordingly, presidential terms of the presidents of the United States may be provided in reverse order as an autosuggestion 215 in the spreadsheet 106 as illustrated in FIG. 2D. Upon receiving an indication of a selection to commit the autosuggestion 215, the data presented in the autosuggestion 215 may be added to the set of data as illustrated in FIG. 2E.

According to embodiments, searching an external data source 114 may help to identify what a user is trying to accomplish based on context. For example, if a user types "Apple®"/"Samsung®," a determination may be made that the user is likely looking for smartphone manufacturers; whereas if the user types "Apple"/"Banana," a determination may be made that the user is likely looking for fruits. According to an embodiment, the data source 114 may be connected to an internal data service that may comb internal data stores of a company or organization, and may determine relationships within them. This may allow for an autosuggestion 215 of related information in an adjacent column that may only be relevant in a specific corporate or organizational setting. For example, a user may enter part numbers associated with parts of a subassembly that a company manufactures. A detection of a pattern may be made (e.g., parts in the subassembly), and an autosuggestion 215 of the parts numbers for some or all of the parts in the subassembly may be provided. As can be appreciated, consent to collect data and to offer the collected data for potential autofill results may require permissions and consent so that privileged data may not be published where/when it should not be.

In a case where a series of data 205 may have an unclear outer limit or natural stopping point, an autosuggestion 215 may include a full series of data, a portion of a series of data, or alternative autosuggestions 215 presented simultaneously or consecutively. For example, if a user starts to enter days of the week, it may be unclear if the user intends to enter five days of the week or seven days of the week if the set of data does not comprise a clear outer limit. According to one embodiment, a plurality of autosuggestions 215 may be displayed from which a user may select a desired fill result. According to another embodiment, an autosuggestion 215 may include a full series of data 205 (e.g., seven days of the week, all the United States presidents, etc.). According to yet another embodiment, an autosuggestion 215 may include a portion of a series of data (e.g., five days of the week). Upon commitment of an autosuggestion 215 of a portion of a series of data, a new autosuggestion 215 of additional data (e.g., remaining data in the series) may be made according to a detected pattern of the extended set of data 205 if applicable. For example, a second autosuggestion 215 of "Saturday" and "Sunday" may be provided to complete the days of the week series.

Figure 3A:
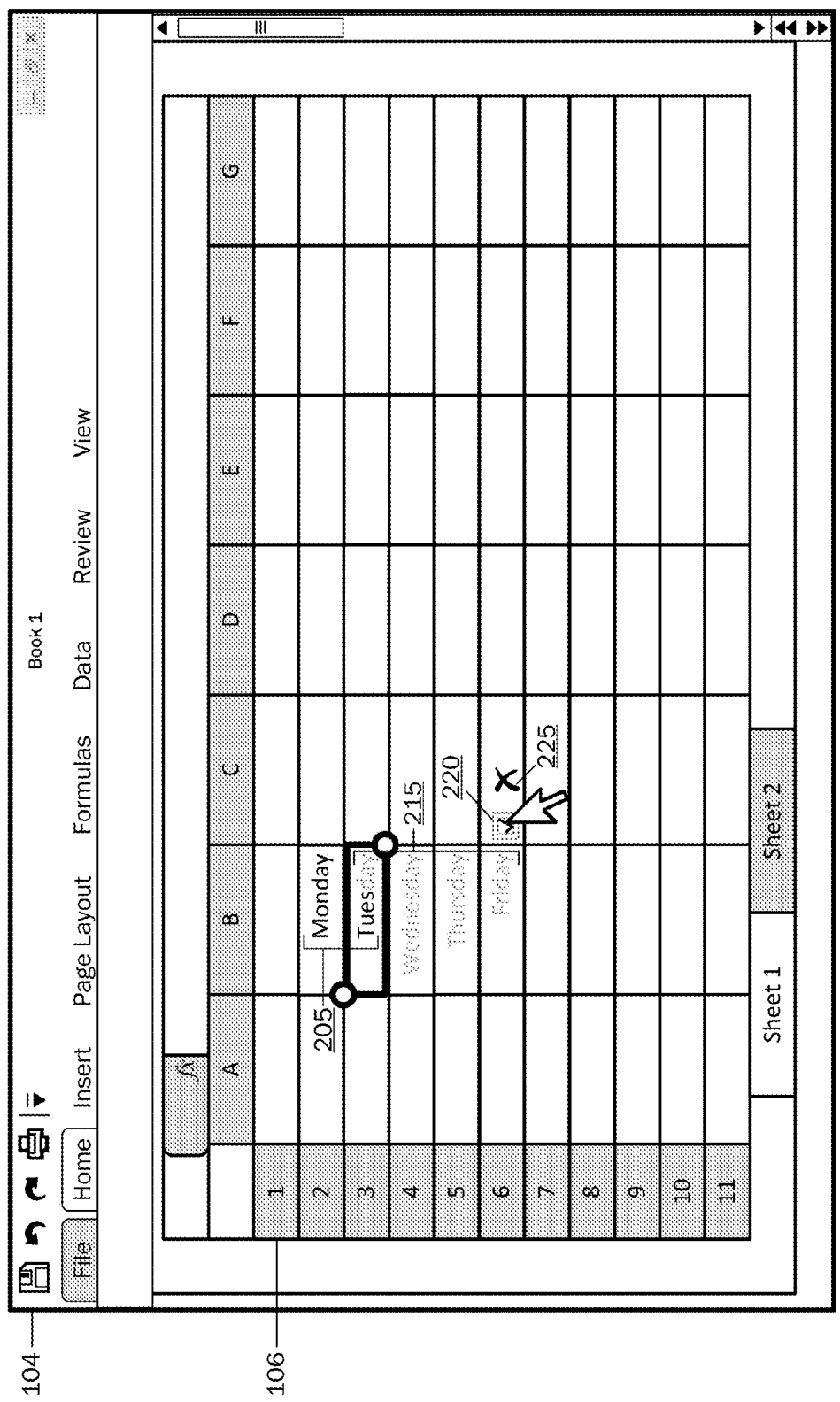
FIGS. 3A-3B illustrate an example of automatically providing an autosuggestion of fill results for a series of data.
Figure 3B:
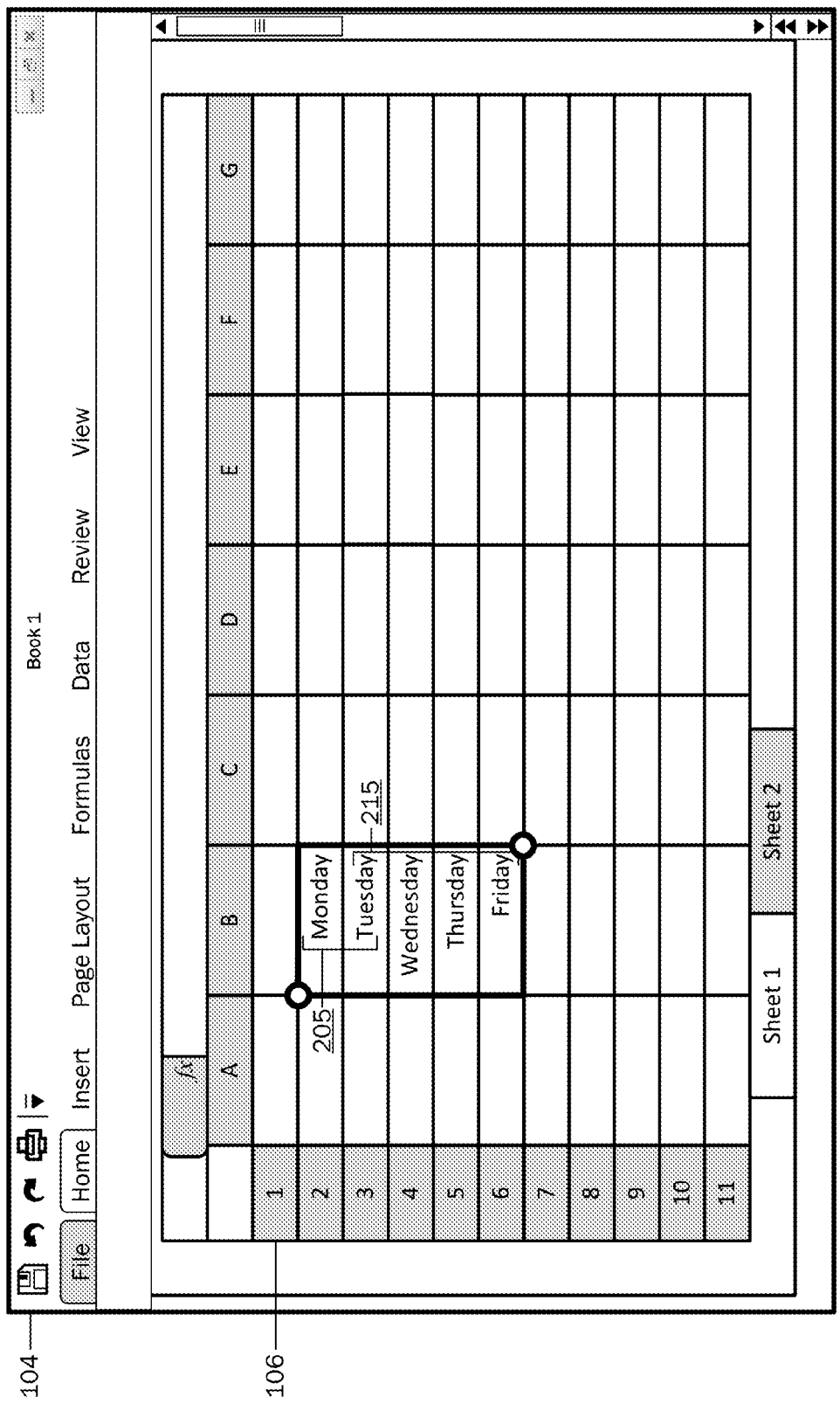

According to another embodiment, and as illustrated in FIGS. 3A-3B, a pattern may be automatically detected as a user inputs data 205. That is, autosuggesting fill results may be provided without a need of a fill handle and without a need of a selection 210 of data. Referring now to FIG. 3A, a user may input data 205 into a first cell, for example, the text "Monday," and may start to enter data 205 in a next cell, for example, the text "Tues" for "Tuesday." A pattern may be automatically detected, and an autosuggestion 215 of a completion of the data 205 (e.g., autocompletion of the text in the second cell), and an autosuggestion 215 of a series or an extension of the pattern may be displayed. As illustrated in FIG. 3B, after a user commits to the autosuggestion 215, the suggested data 205 may be inserted into the spreadsheet 106.

Figure 4A:
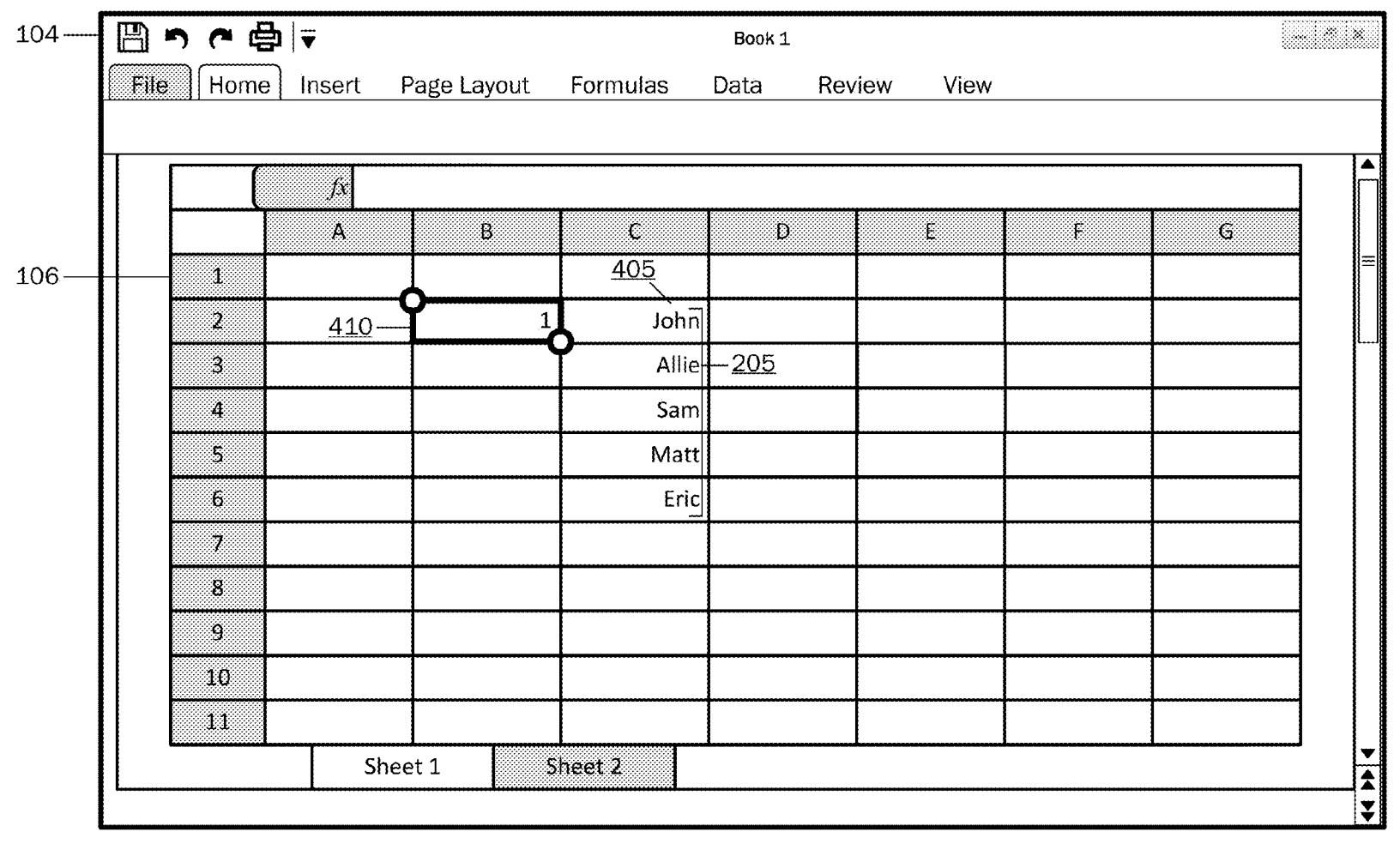
Figure 4B:
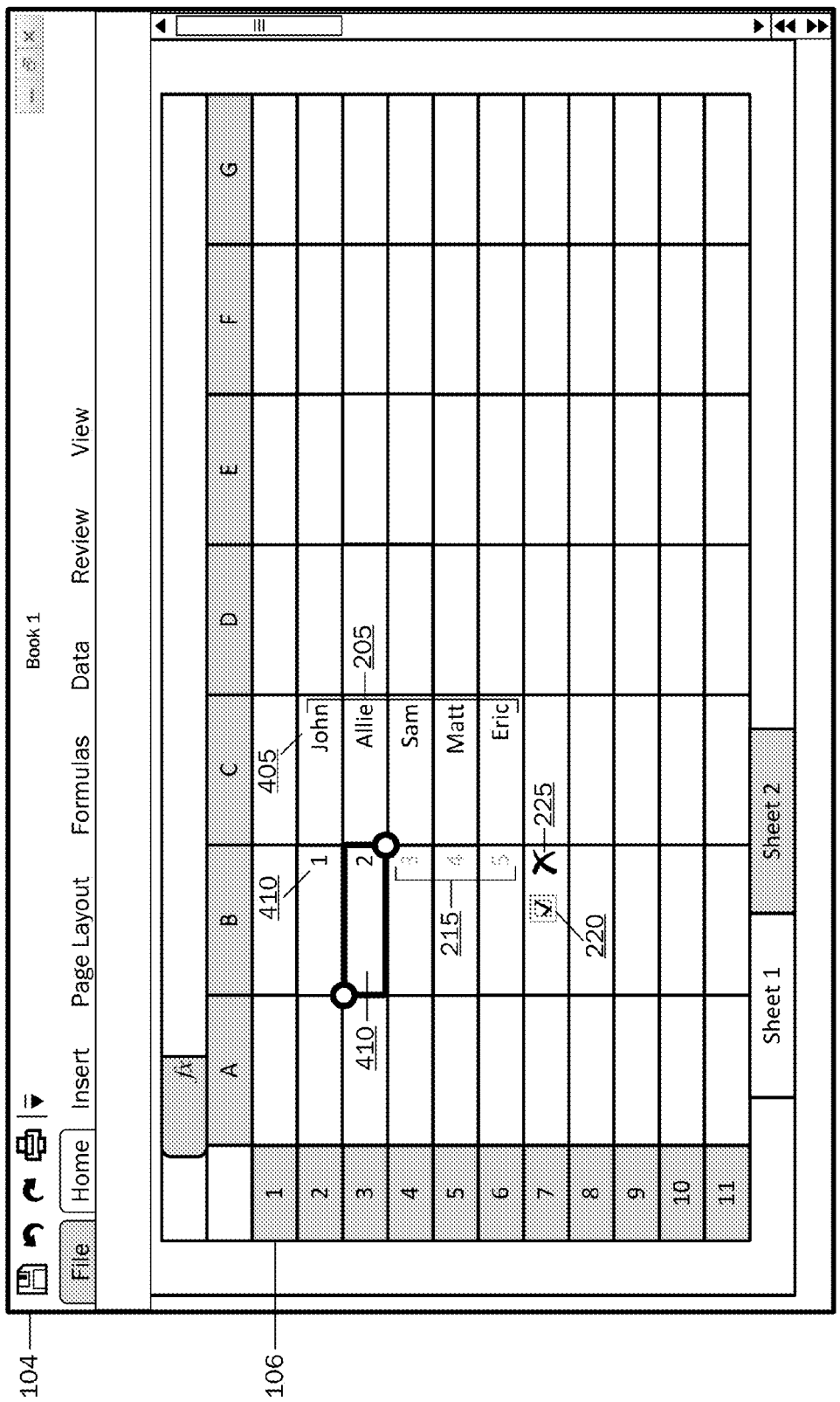

With reference now to FIGS. 4A-4B, an example of recognition of an outer limit of a set of data 205 and providing an autosuggestion 215 of a series based on the recognized outer limit. As illustrated in FIG. 4A, a user may enter data 205 into a table 405, for example, a list of names. The user may then enter data 205 into an adjacent cell 410. Referring now to FIG. 4B, a pattern may be detected as more data 205 is entered. An outer limit of the table may be recognized, and an autosuggestion 215 of a series of data 205 may be displayed according to the outer limit. For example, the autosuggestion 215 may include providing a fill result of 3-5 as there are five names included in the table 405.

Embodiments may also provide for splitting data 205 in a cell into two or more components via an intuitive UI. A variety of methods may be utilized for splitting data 205. FIGS. 5A-5G and FIGS. 6A-6B illustrate a method of splitting data 205 via example, FIGS. 7A-7F illustrate a method of splitting data 205 via touchable tokens, and FIGS. 8A-8C illustrate a method of splitting data 205 via a slider UI.

Figure 5A:
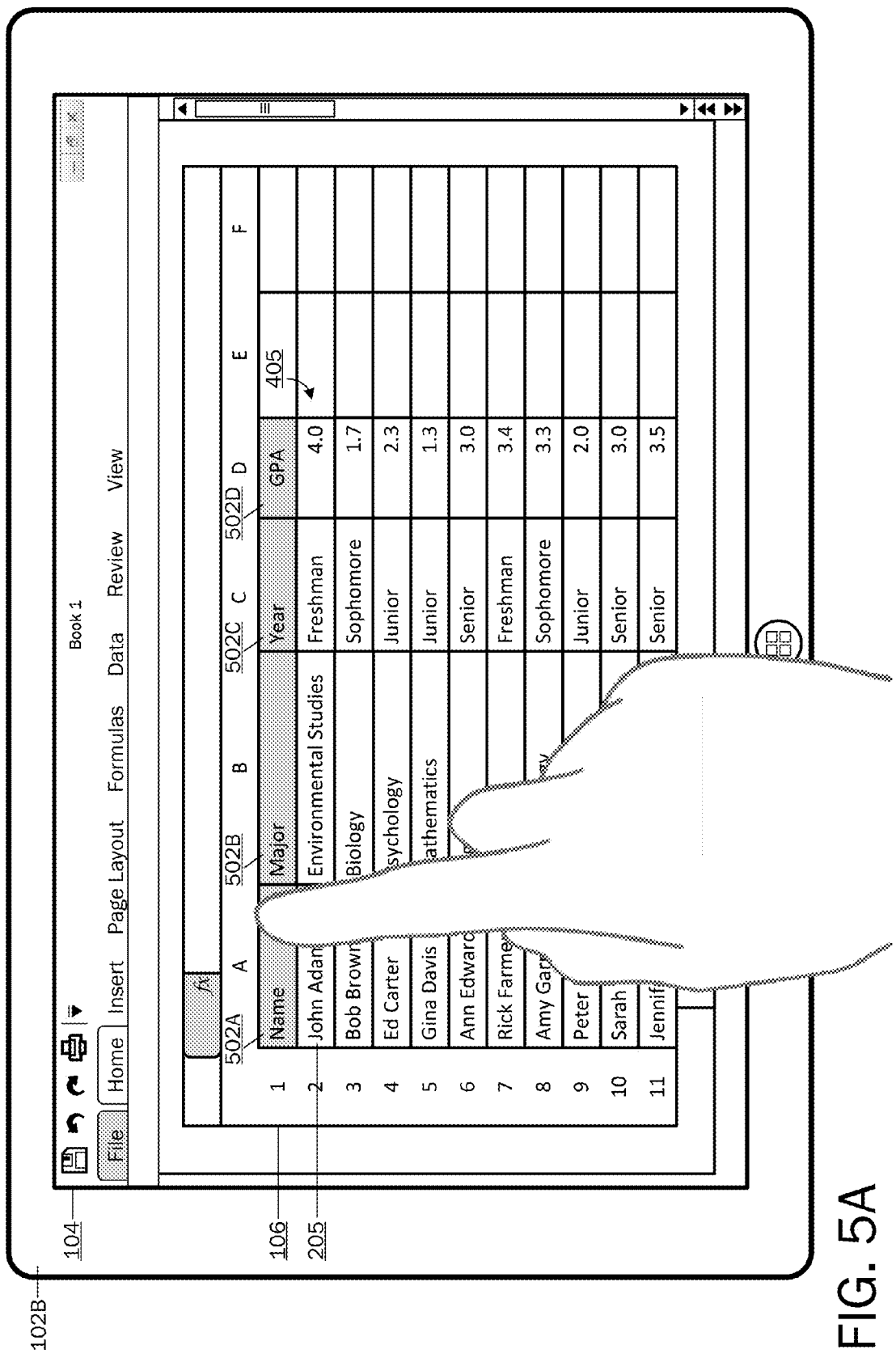

Referring now to FIG. 5A, a spreadsheet application 104 UI is shown displayed on a tablet computing device 102B, and includes a table 405 of data 205 in a spreadsheet 106. As illustrated, the table 405 includes four columns 502 of data 205. Oftentimes, a user may wish to split data 205 into two or more components. For example, Column A 502A includes a listing of students' first and last names. A user may wish to separate out the students' first and last names into two separate entities, such that first names are listed in one column, and last names are listed in another column. According to one embodiment, a user may select a column 502 of data 205 he wants to split. For example and as illustrated in FIG. 5A, a user may select Column A 502A. Although illustrated as a selection via touch, it should be appreciated that a column 502 may be selected via various input methods known in the art.

Figure 5B:
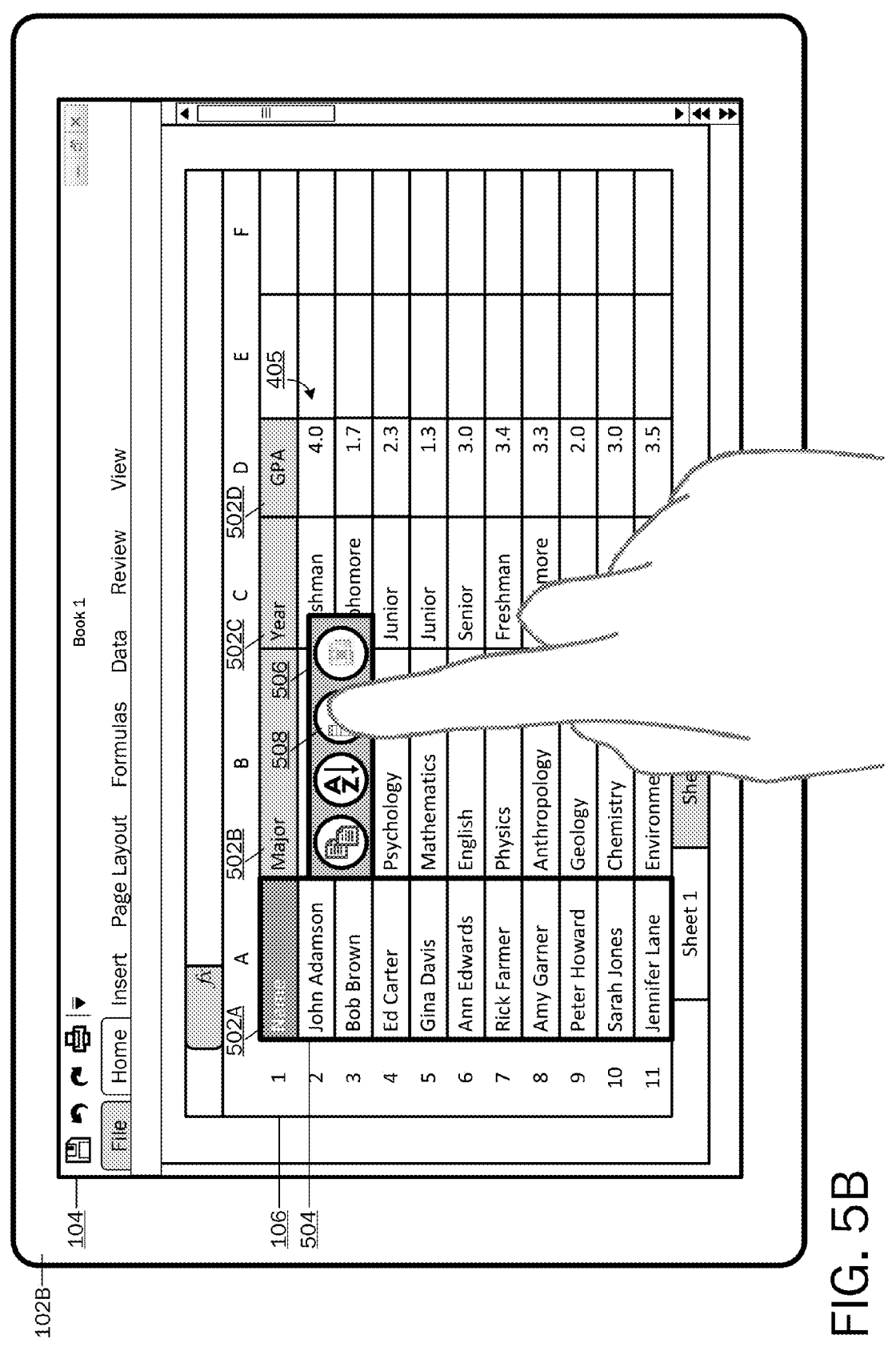

With reference now to FIG. 5B, after a selection of a column 502A comprising data 205 to split is made, a user may select to split a column 502 via one of various methods. According to one embodiment, a contextual UI 506 comprising a split column command 508 may be displayed, wherein a user may select the split column command 508, for example, by tapping or clicking on the command. As can be appreciated, split column functionality may be selected via a keyboard shortcut key or via other methods. According to an embodiment, an option may be provided for allowing the user to select a number of columns 502 to split off of a selected column 504. For example, if the students' names included their middle names, the user may choose to split the students' names by first, middle, and last names.

As illustrated in FIG. 5C, upon selection of a split column command 508, an extra column 502E may be inserted adjacent to the selected column 504. A commit UI 220 and/or a dismiss UI 225 may also be displayed, allowing the user to accept or reject the insertion of the extra column 502A. A tooltip UI 510 may also be provided, which may include a message offering information about what the user may enter in a cell.

Figure 5D:
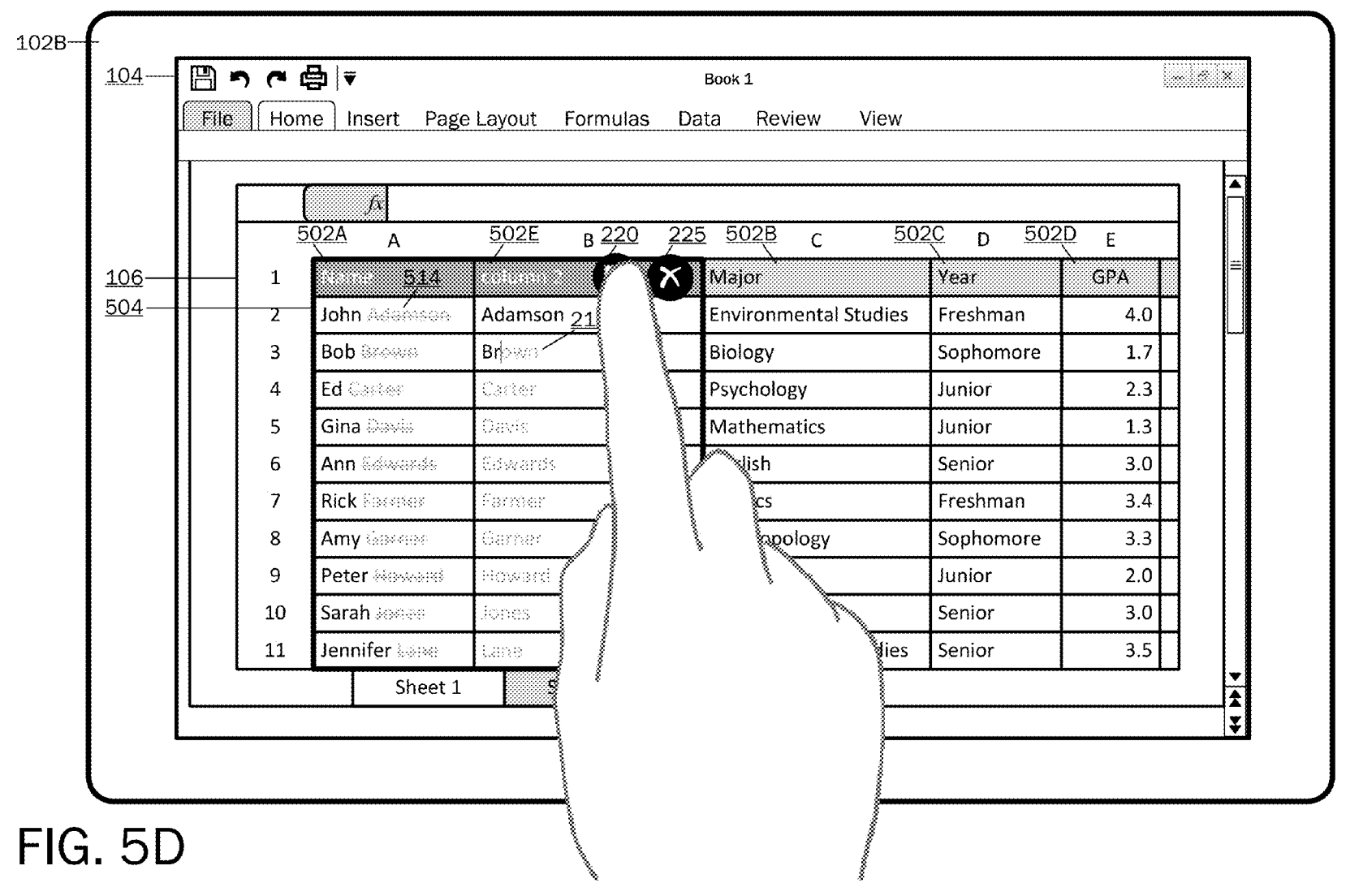

Referring now to FIG. 5D, the user may input the data he wants into the extra column 502E. For example, the user may enter the last name of the first student in the list in the extra column 502E. As the user starts to enter the last name of the second student in the list, the input may be detected and used as an example for applying to other content in a data set. Detecting the input may include detecting a pattern. For example, the detected pattern may include splitting a first and second word in a cell in the selected column 504, and moving the second word into the extra column 502E. Accordingly, a determination may be made to use the detected pattern as an example to apply to the rest of the cells in the selected column 504. An autosuggestion 215 to split the two words (e.g., first and last name) in the selected column 504, and to move the second word (e.g., last name) to an adjacent cell in the extra column 502E. The autosuggestion 215 may also include a strikethrough 514 through the data in the selected column 504 that is determined to be split off and moved to the extra column 502E. A commit UI 220 and/or a dismiss UI 225 may also be displayed, allowing the user to accept or reject the autosuggestion 215. If the user accepts the autosuggestion 215, the data in the selected column 504 may be split accordingly between the selected column 504 and the extra column 502E. As can be appreciated, a user may choose to split data 205 into a plurality of columns 502.

Figure 5E:
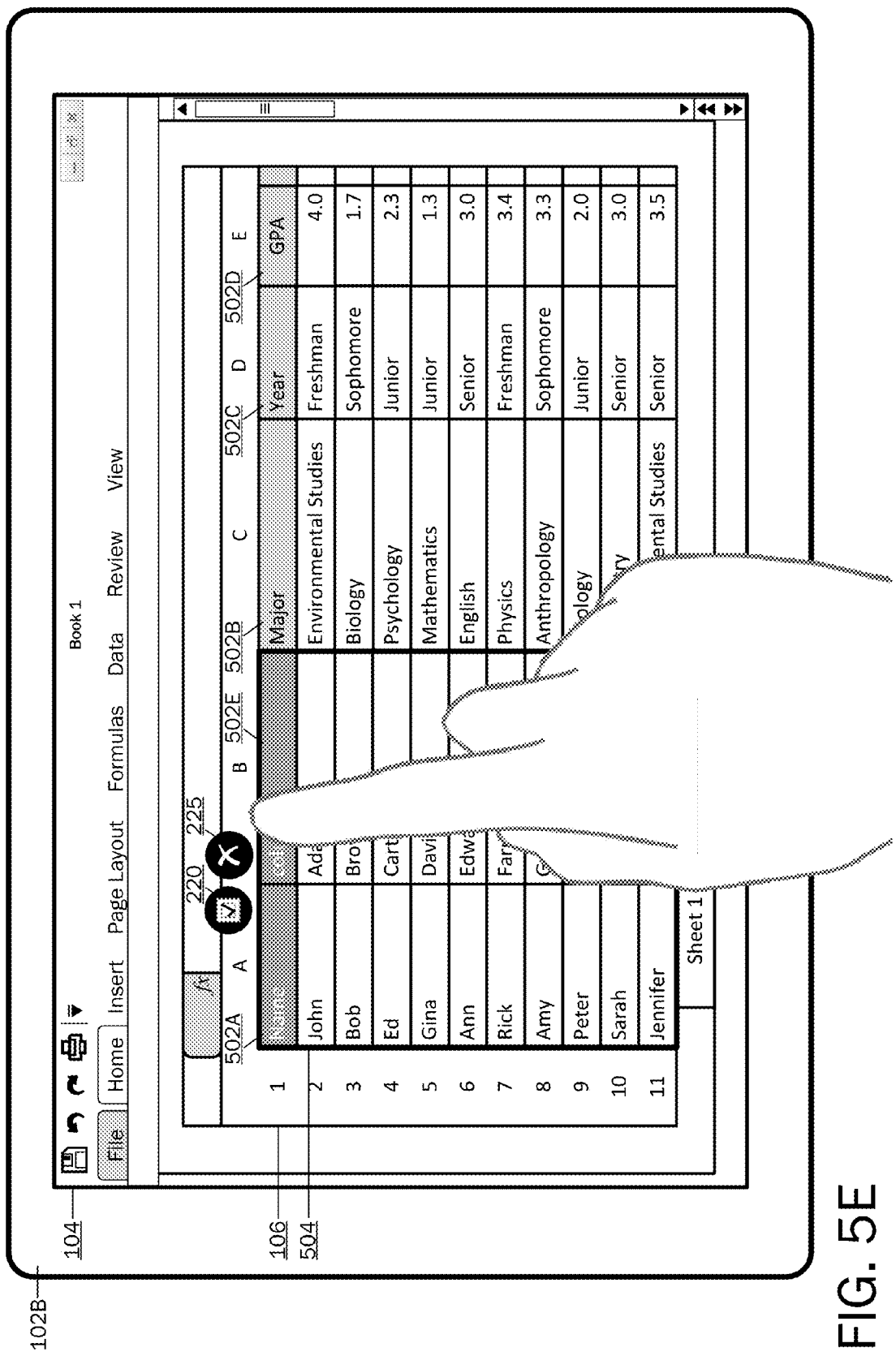

As illustrated in FIGS. 5E-5F, a user may select a cell in the extra column 502E to edit the data 205. For example, the user may select to rename the extra column 502E in the table 405. The resulting table 405 comprising the split data 205 is illustrated in FIG. 5G.

Figure 6A:
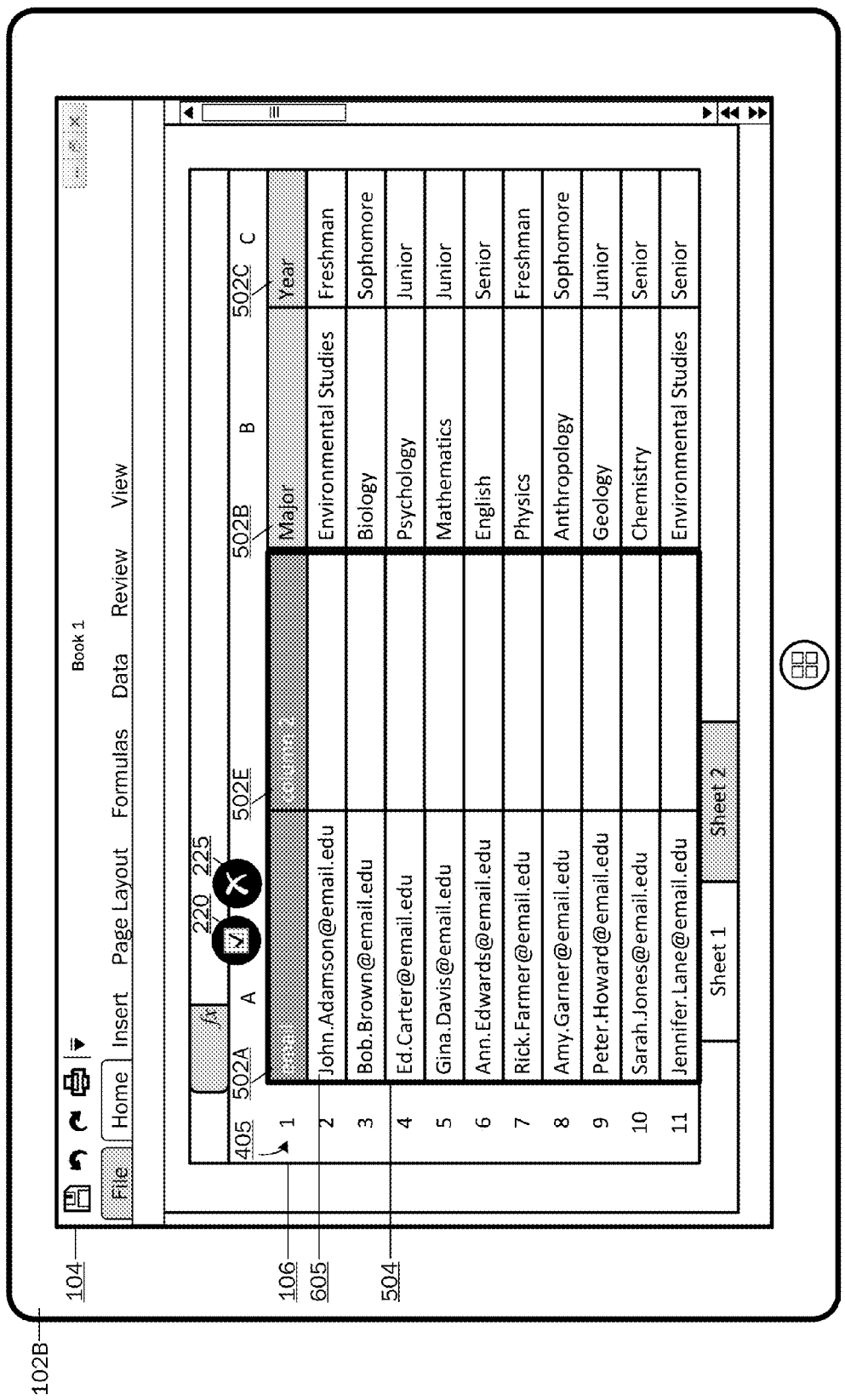
Figure 6B:
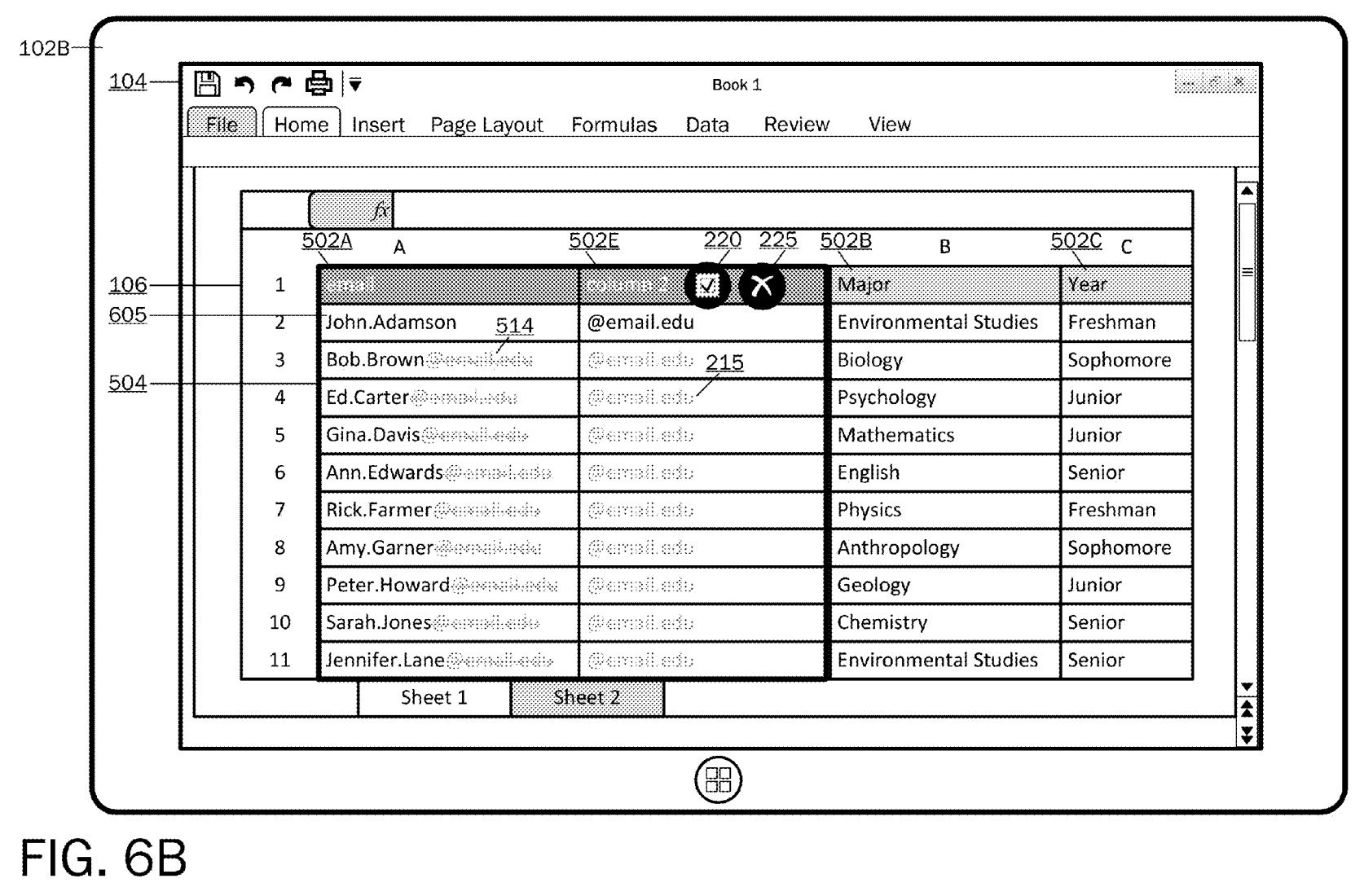
Figure 6C:
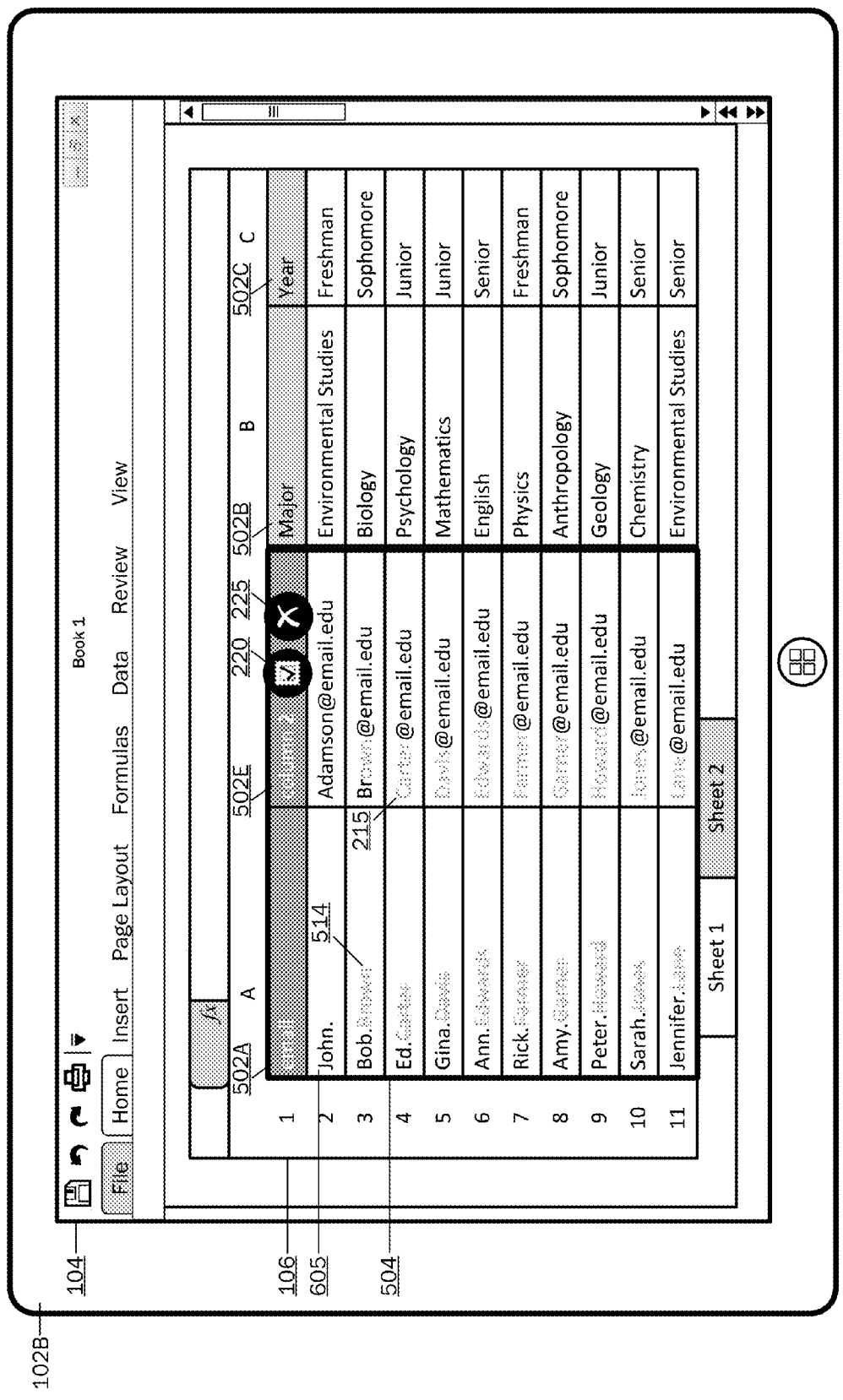

FIGS. 6A-6C illustrate another example of splitting data 205 via example. As described above with reference to FIG. 5C, upon selection of a split column command 508, an extra column 502E may be inserted adjacent to the selected column 504. FIG. 6A shows a table 405 after an extra column 502E has been inserted. The selected column 504 may comprise data, which may be a text string 605, such as an email address. The user may wish to split the text string 605 to extract a portion of the text string 605. For example, if the text string 605 is an email address, and if the text string comprises a student's first and last name as illustrated in FIG. 6A, the user may wish to extract out the students' name from the email address (i.e., text string 605).

As illustrated in FIG. 6B, the user may enter a portion of the text string 605 from a selected column 504 in an adjacent extra column 502E. For example, the user may cut and paste or may type in "@email.edu" (i.e., portion of a first text string 605) in an adjacent cell in the extra column 502E, and may cut and paste or start to type the same portion of a next text string 605 in a next cell in the extra column 502E. A detection of a pattern may be made, wherein the pattern may include splitting data in a cell in the selected column 504, and moving the split data into the extra column 502E. Accordingly, a determination may be made to use the detected pattern as an example to apply to other content in the data set, that is, to split the text strings 605 in the rest of the cells in the selected column 504 in a same pattern as was detected, and to display an autosuggestion 215 of the split data displayed in the extra column 502E.

According to embodiments and with reference now to FIG. 6C, in addition to providing for splitting data, combining data 205 may also be provided. The user may add another portion of the text string 605 from the selected column 504, and add it to (combine it with) data in the extra column. For example and as illustrated, the user may add the last name from the text sting 605 in the selected column 504 to the text string 605 in the extra column 502E. The user may start to add the last name of the next text string 605 in the selected column 504 to the adjacent cell in the extra column 502E, and a detection of a pattern may be made and used as an example to apply to other content, wherein the pattern may include splitting data (e.g., last name) in the cells in the selected column 504, and combining a portion of the text string 605 (e.g., the last name) with data 205 (e.g., "@email.edu") in the extra column 502E.

FIGS. 7A-7F illustrate a method of splitting data 205 via touchable tokens. According to embodiments, when a user wants to split a piece of data 205 into two or more components, instead of having to resort to a manual method (e.g., via formulas) or via other methods which may require multiple steps, selectable tokens may be provided. Individual data elements 710 may be tokenized, wherein each data element 710 may become a token 705A, 705B or a selectable and draggable (i.e., moveable) UI element. When a token is moved to a cell, for example, into a new column 502, and committed to the cell, the token may then become a data element 710 again.

Figure 7A:
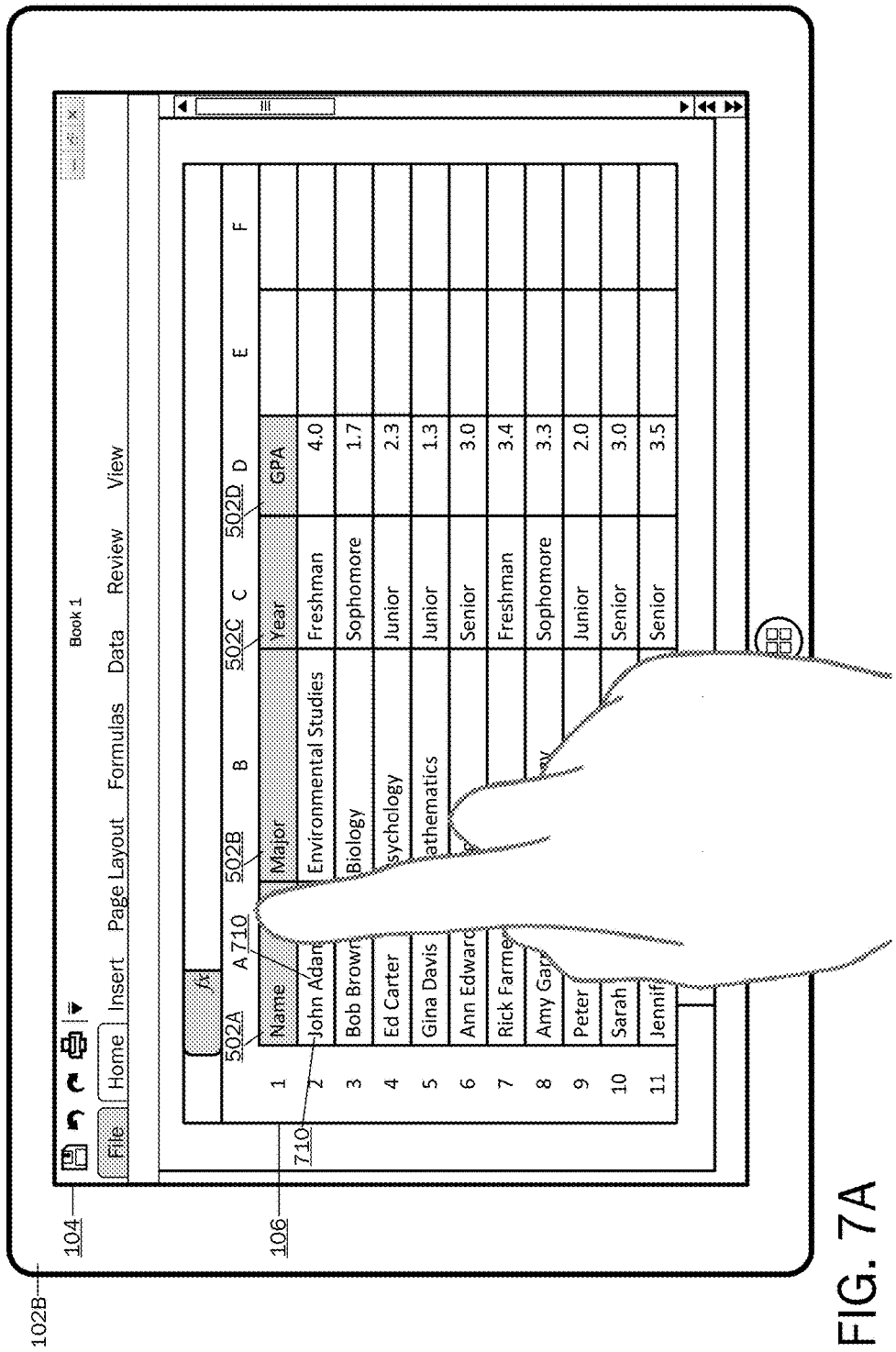
FIGS. 7A-7F illustrate an example of splitting data via touchable tokens.
Figure 7B:
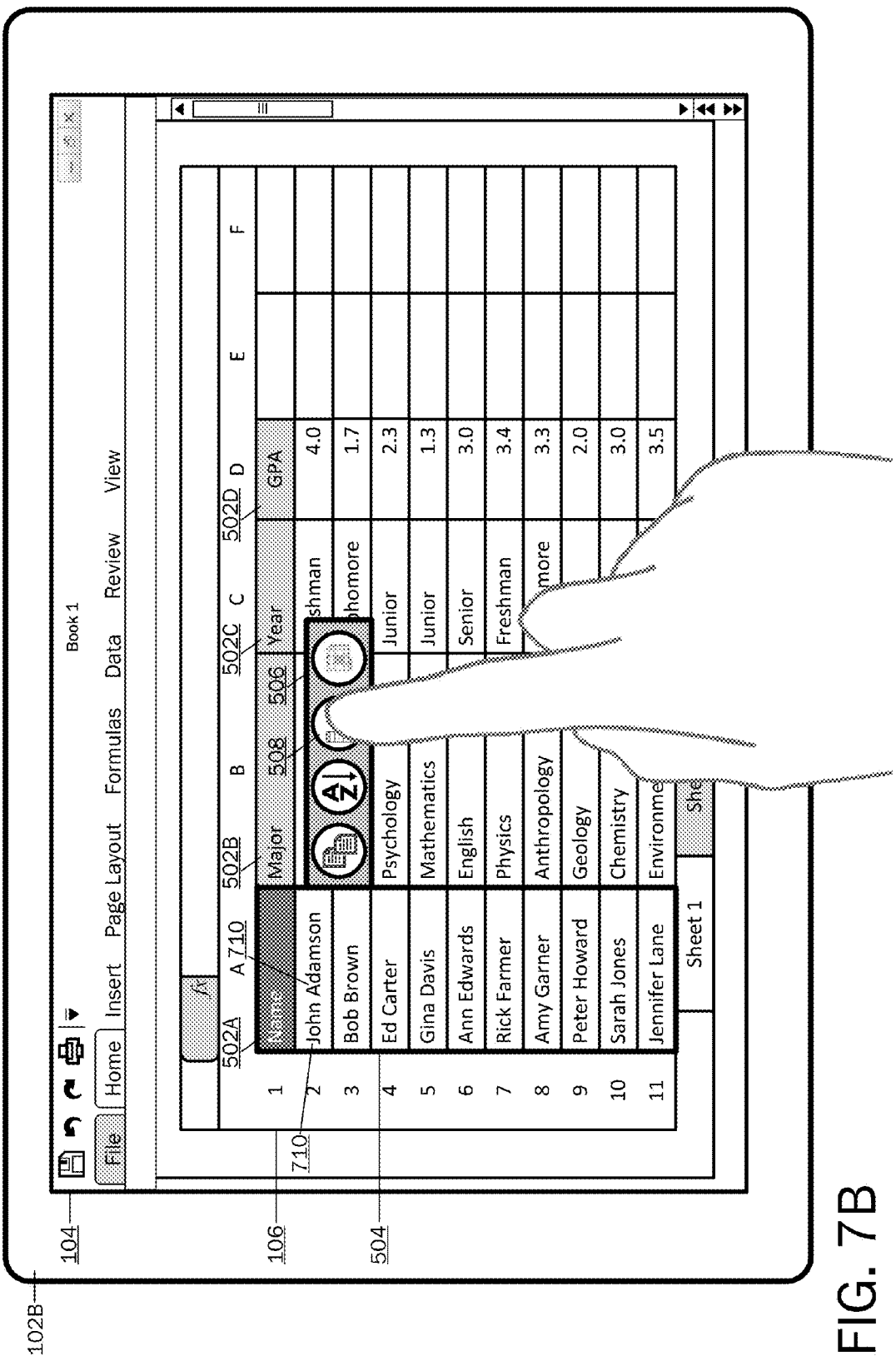
Figure 7C:
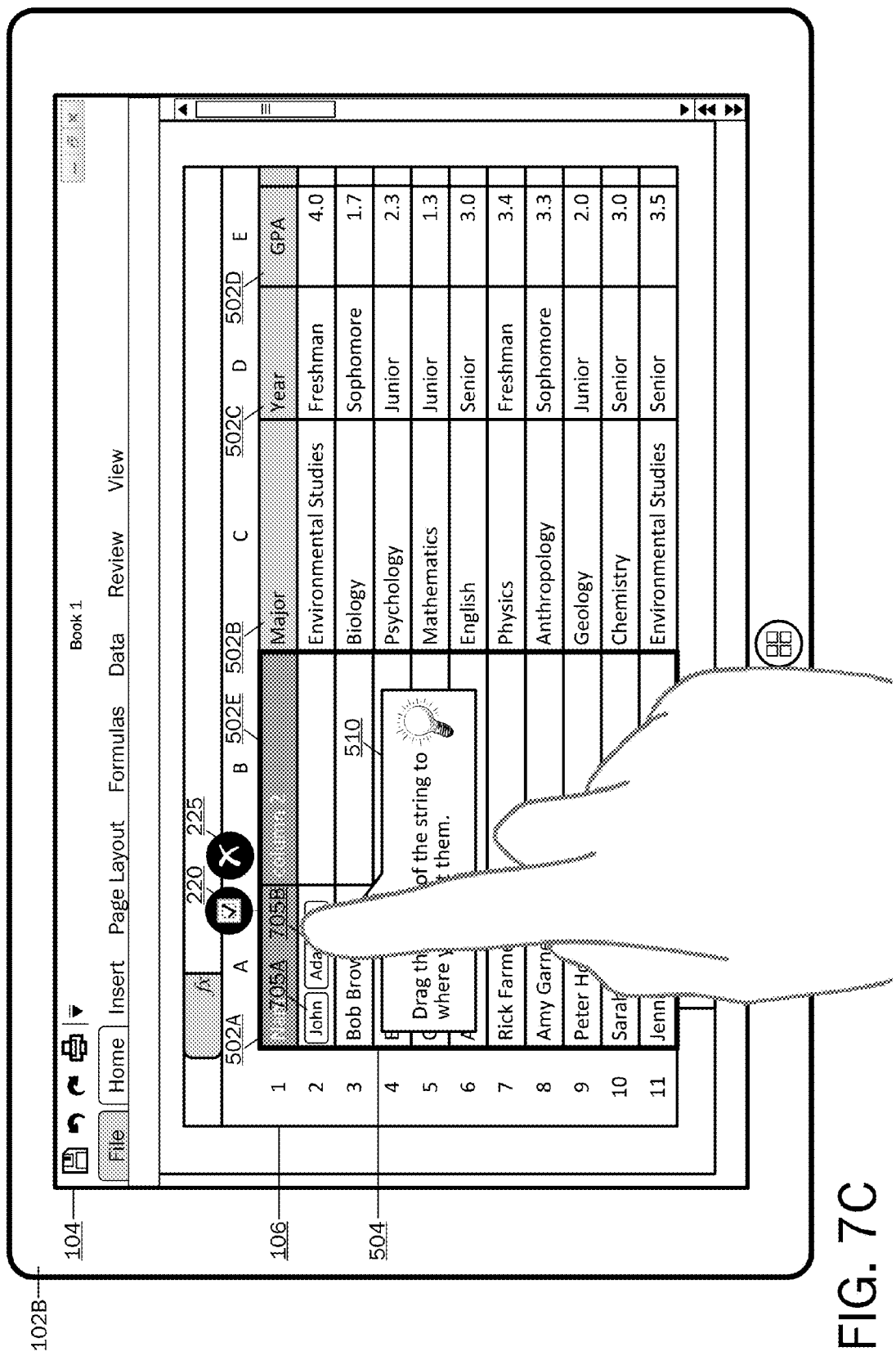
Figure 8A:
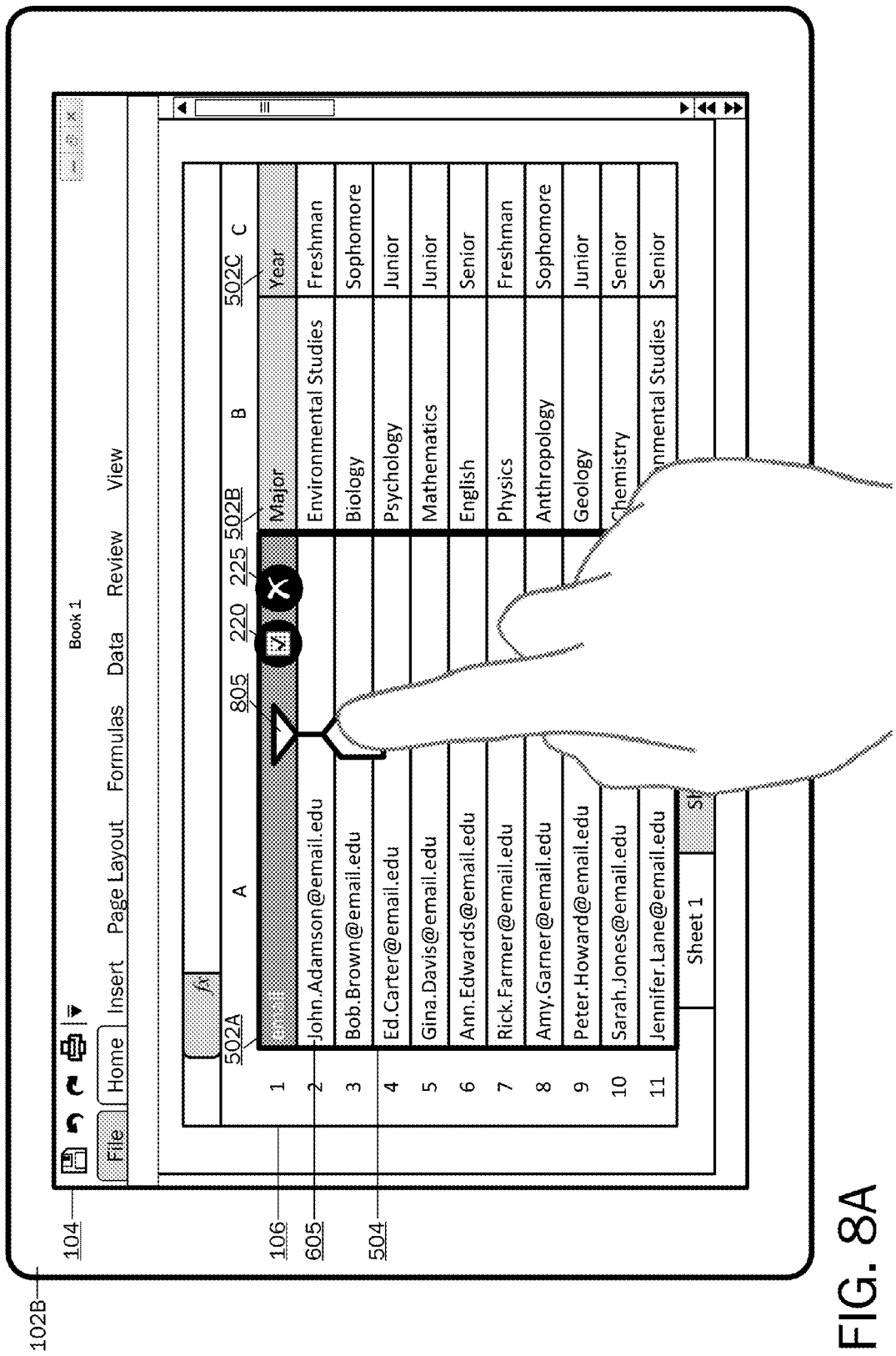
FIGS. 8A-8C splitting data via a slider UI.
Figure 8B:
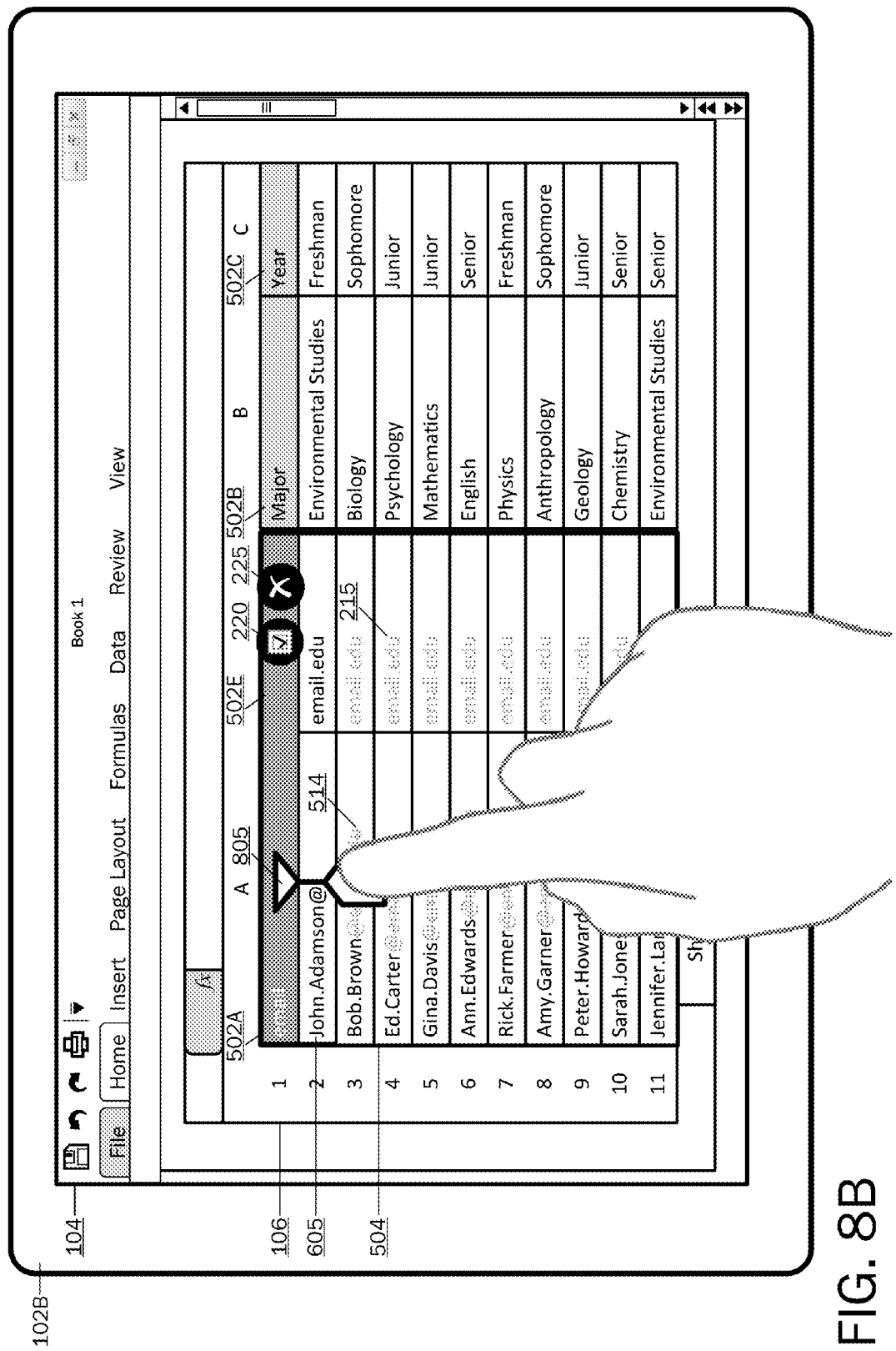
Figure 8C:
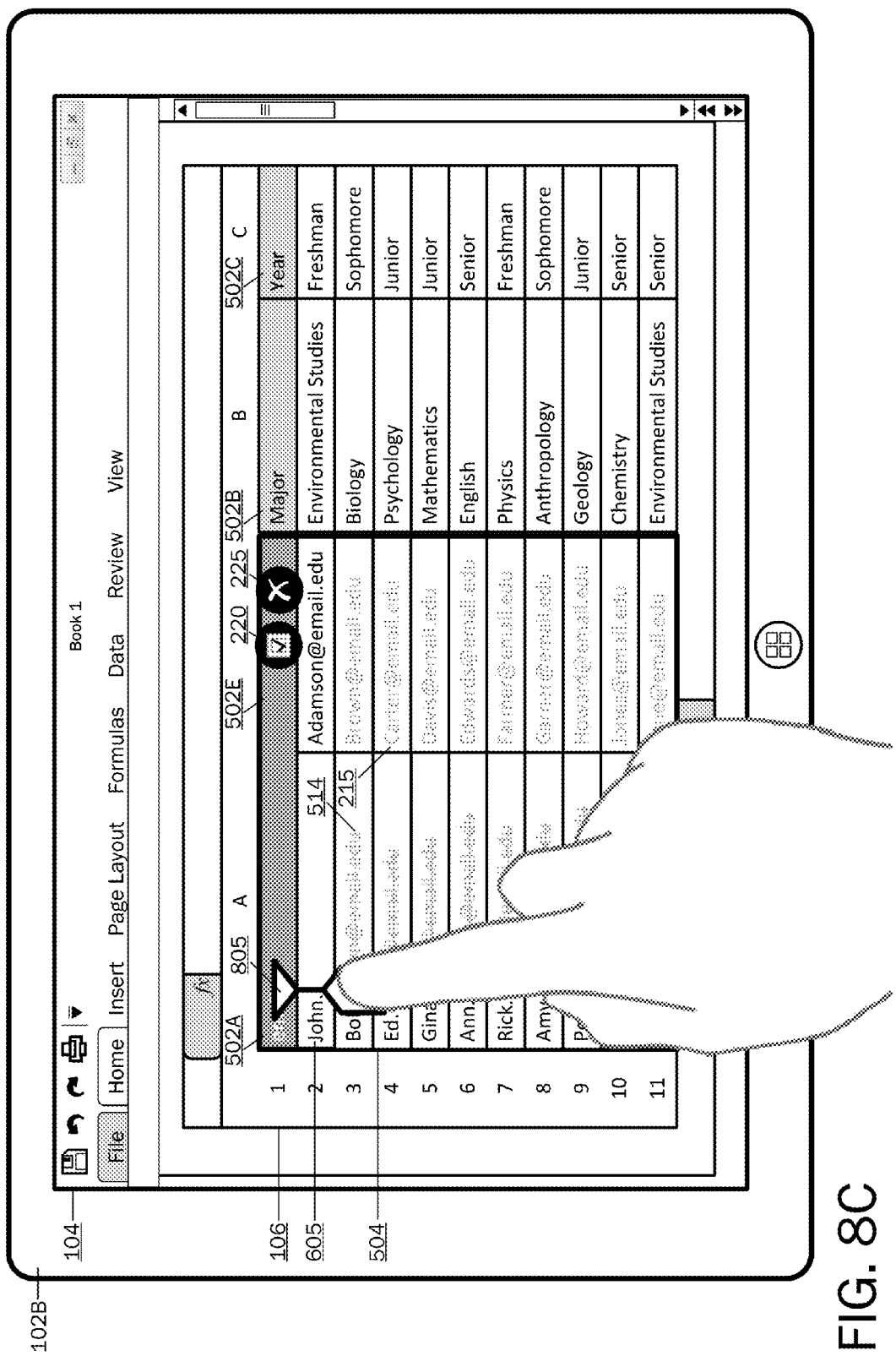

Referring now to FIG. 7A, a user may select a column 502A. As illustrated in FIG. 7B, a contextual UI 506 comprising a split column command 508 may be displayed, wherein the user may select the split column command 508, for example, by tapping or clicking on the command. As can be appreciated, split column functionality may be selected via a keyboard shortcut key or via other methods. According to an embodiment, an option may be provided allowing the user to select a number of columns 502 to split off of the selected column 504. Upon selection of a split column command 508, and with reference now to FIG. 7C, tokenized data elements (i.e., tokens 705A, 705B) may be provided in the selected column 504. A tooltip UI 510 may also be provided, which may include a message offering information about how to manipulate the tokens 705.

Figure 7D:
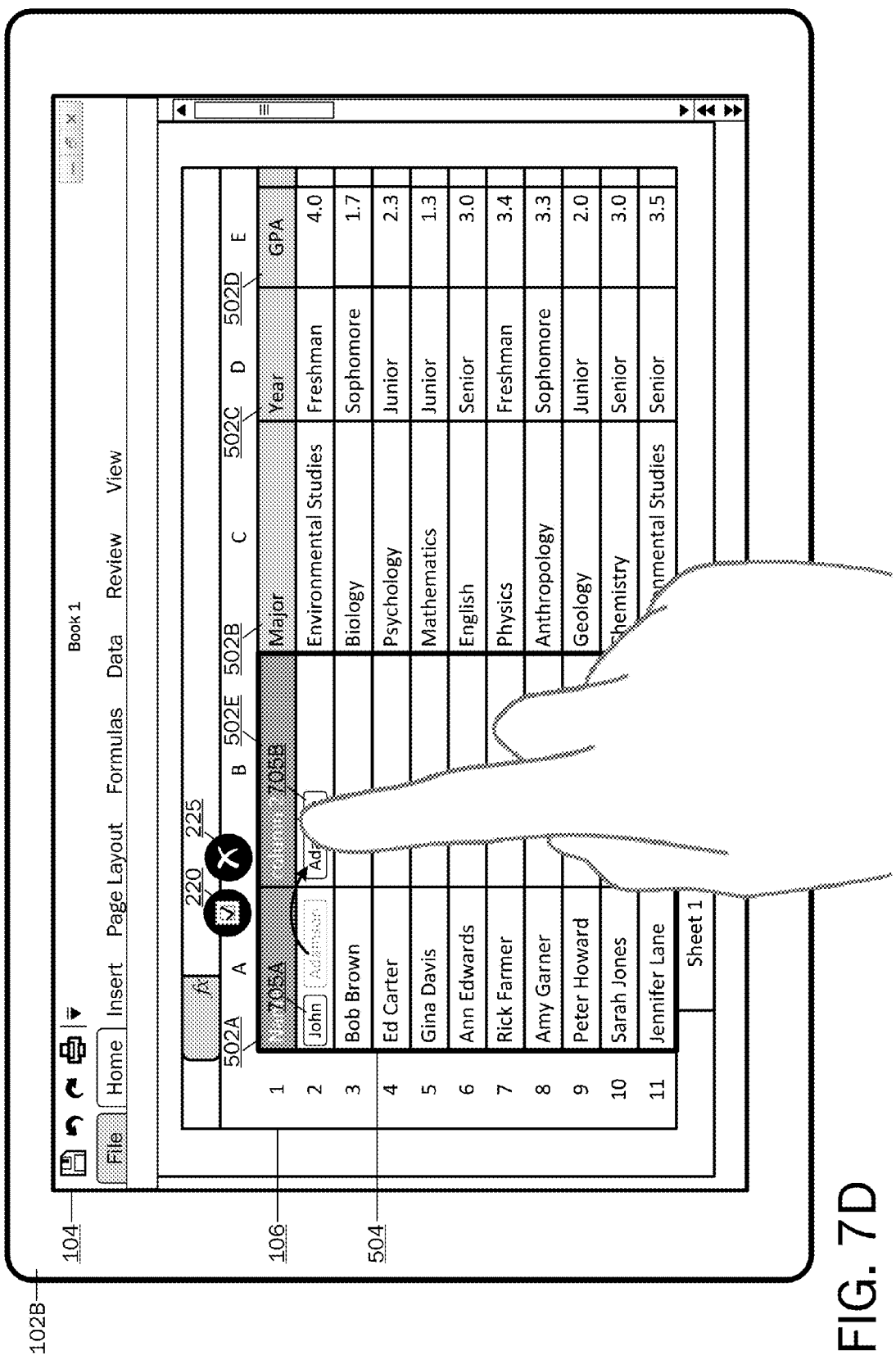
Figure 7E:
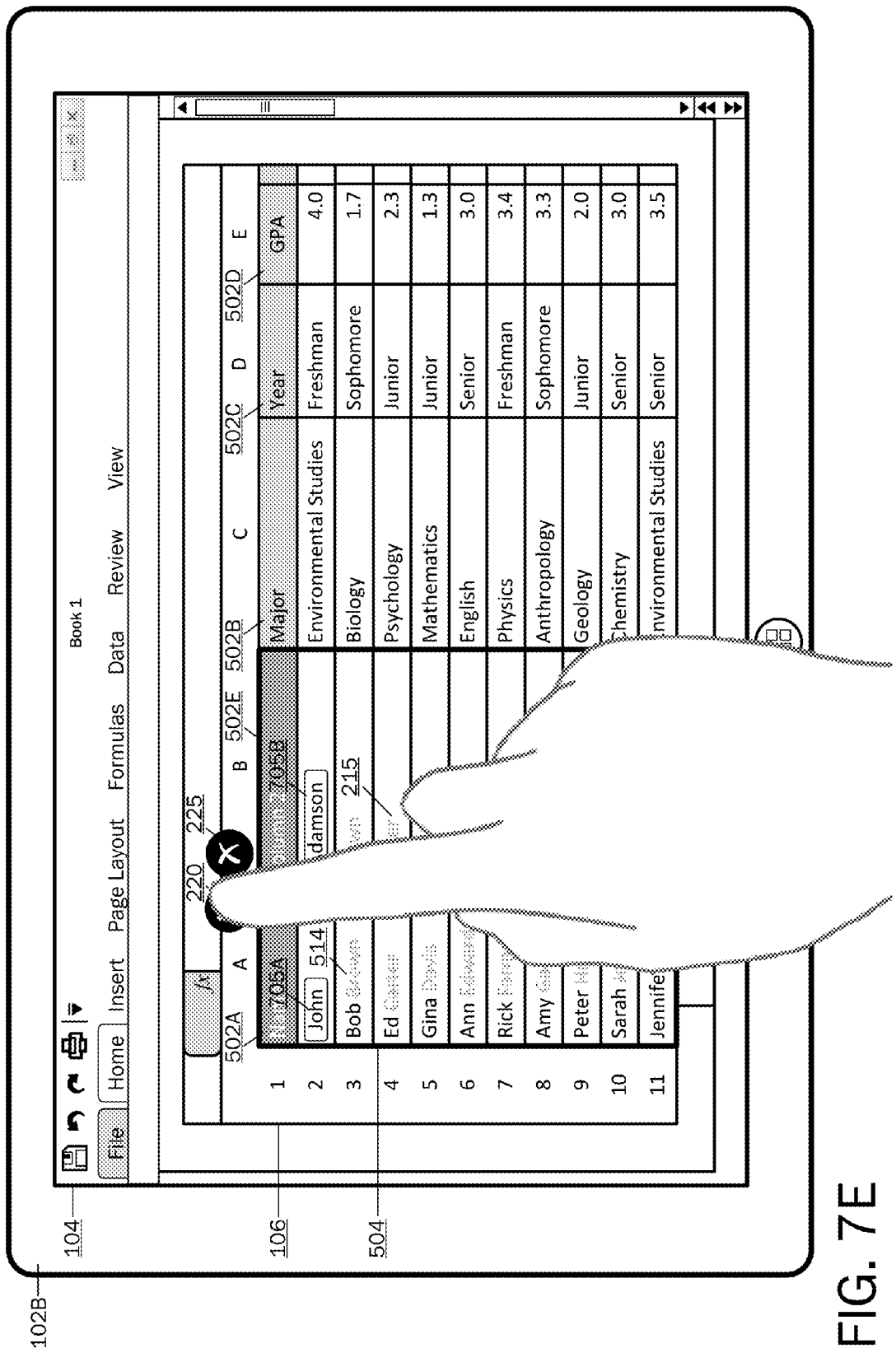
Figure 7F:
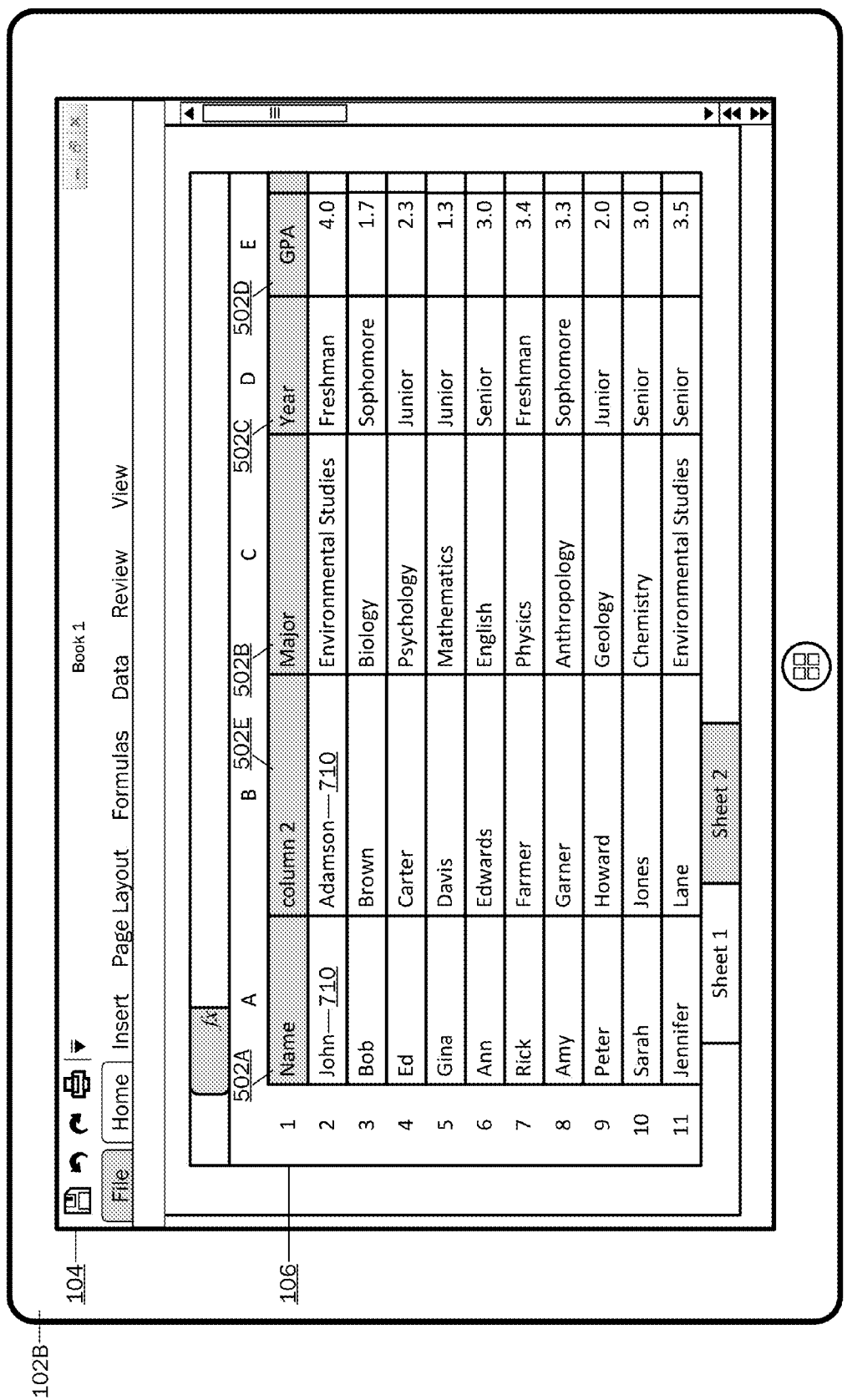

As illustrated in FIG. 7D, the user may select and drag a token 705B from one cell to another cell, for example, from a cell in the selected column 504 to a cell in the extra column 502E. Accordingly, a detection of a pattern may be made, and an autosuggestion 215 applying the detected pattern to data elements matching the same conditions of the detected pattern in the cells in the selected column 504 of the table 405 may be provided. For example and as illustrated in FIG. 7E, an autosuggestion 215 where the last name of each of the students' names are removed from Column A 502A and moved to the extra column 502E may be displayed. A commit UI control 220 and/or a dismiss UI control 225 may also be provided. The user may select the commit UI control 220, or may select the autosuggestion 215, and accordingly, the tokens 705 may return to data elements 710, and the fill results provided in the autosuggestion 215 may be applied as illustrated in FIG. 7F.

FIGS. 8A-8C illustrate a method of splitting data 205 via a slider UI 805. According to embodiments and with reference now to FIG. 8A, when a split column functionality is utilized to split a column 502 into two or more columns, one or more slider UIs 805 may be provided for splitting data between the two or more columns 502. As illustrated in FIG. 8A, a slider UI 805 is provided between Column A 502A and Column B 502B.

With reference now to FIG. 8B, the slider UI 805 may be selected and slid over data 205 in a cell. When the slider UI 805 is released, the data 205 may be split according to the position of the slider UI 805. According to an embodiment, a live preview of the splitting of the data 205 may be provided, allowing the user to see how the data 205 may be split between columns 502. According to another embodiment, a slider UI 805 may snap to certain points in a text string 605 according to a set of rules (e.g., snap to an end of a word, snap to a punctuation mark, etc.). Embodiments may also comprise detecting a pattern according to the split data 205, and providing an autosuggestion 215 of applying the detected pattern to data 205 in the table 405 that may match conditions of the detected pattern. For example, in FIG. 8B, the user has slid the slider UI 805 over the text string 605 in Column A 502A to the right of the "@" in the student's email address. Accordingly, either a preview (if the user has not released the slider UI 805) or an autosuggestion 215 (if the user has released the slider UI 805) may be provided, showing to the right of the "@" split from the text string 605 and pulled into the extra column 502E.

As another example and as illustrated in FIG. 8C, the user may continue to slide the slider UI 805 over the text string 605 until the slider is between the period and the student's last name. Accordingly, the data to the right of the slider UI 805 may be split from the data to the left of the slider UI 805 as illustrated. A commit UI control 220 and/or a dismiss UI control 225 may also be provided. The user may select the commit UI control 220, or may select the autosuggestion 215, and accordingly, the slider UI 805 may disappear, and the fill results provided in the autosuggestion 215 may be applied.

Figure 9:
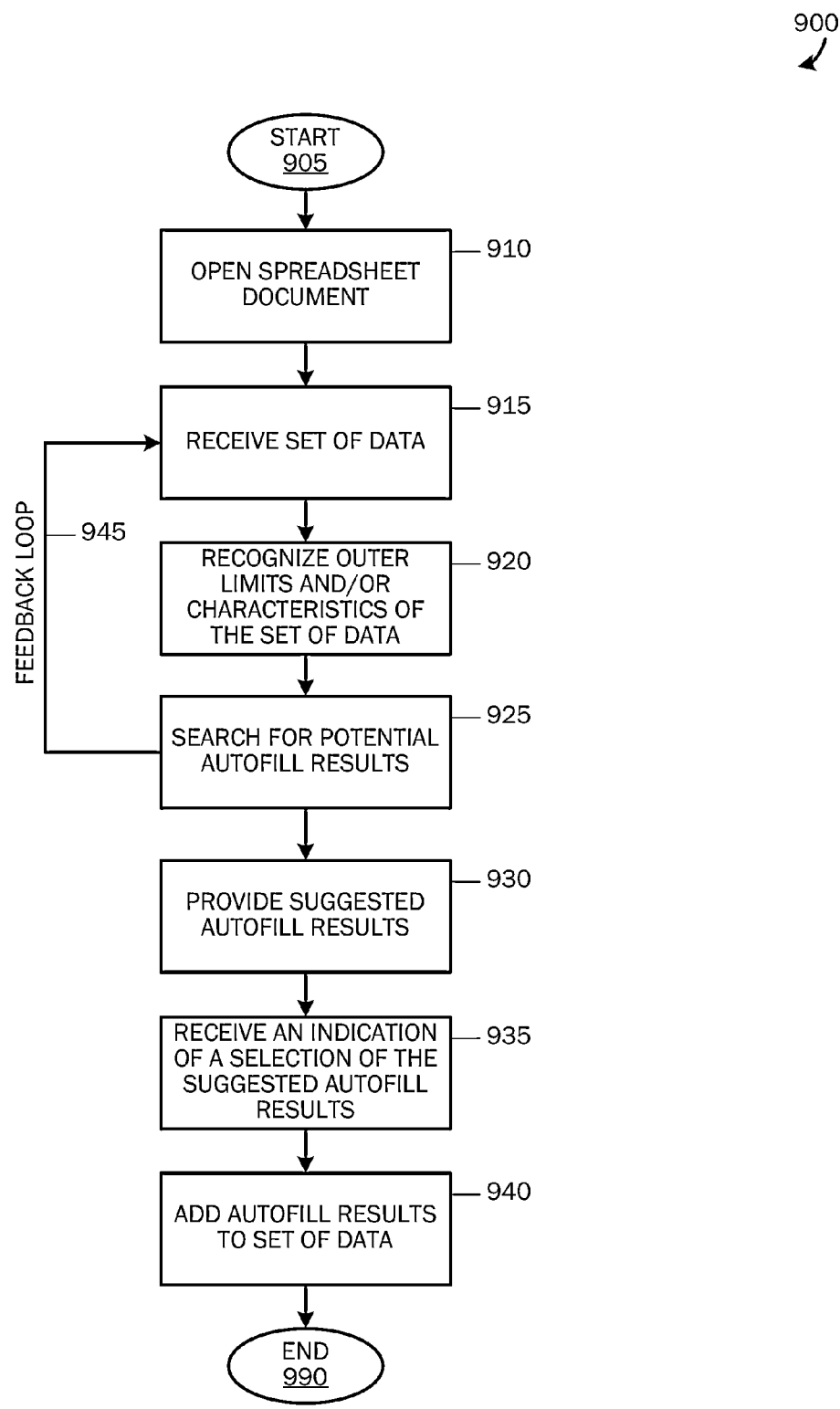
FIG. 9 shows one embodiment of a method for autosuggesting autofill results for a set of data.

With reference now to FIG. 9, a flow chart illustrating a method 900 for autosuggesting autofill results for a set of data 205 according to one embodiment is provided. The method 900 starts at OPERATION 905, and proceeds to OPERATION 910, where a spreadsheet 106 document (e.g., spreadsheet workbook) is opened for use in a spreadsheet application 104. At OPERATION 915, a set of data 205 may be received. The set of data 205 may include an entering of data 205 into a table 405, a range of cells, etc. in the spreadsheet 106 by a user.

The method 900 may proceed to OPERATION 920, where characteristics such as outer limits, shape, size, etc. associated with the set of data 205 may be recognized. Characteristics may be visible on the UI (e.g., table 405), or may not be visible (e.g., web service or database). At OPERATION 925, a search for potential autofill results may be made. As described above, the search may include searching internal and external data sources 114 for potential results. The search may also include using contextual information in the data 205 for determining what the user may be trying to accomplish, and to determine what related information may be relevant to the user.

At OPERATION 930, one or more suggested autofill results (i.e., autosuggestion 215) may be provided to the user and displayed in the UI. According to one embodiment, an autosuggestion 215 may be "ghosted in" as illustrated in the figures, or may be surfaced in other ways (e.g., hovering next to a cell, presented in a task pane, presented in a status bar, etc.). If the set of data 205 has an unclear stopping point, the autosuggestion 215 may be provided in portions of a series (e.g., five days of the week versus seven days of the week).

The method 900 may proceed to OPERATION 935, where an indication of a selection to commit an autosuggestion 215 is received. The commitment may be received in various ways, for example, a selection of a commit UI 220 control, via a selection (e.g., tap, click, etc.) of the autosuggestion 215. When an indication of a selection to commit to the autosuggestion 215 is received, the method 900 may proceed to OPERATION 940, where the suggested data is inserted into the spreadsheet 106.

The method 900 may include a feedback loop 945, where the user's input and selections of suggested autofill results may be tracked and used for providing more relevant suggestions. According to an embodiment, new fill patterns may be learned, for example, in a tabular data set, pattern from users may be recorded. For purposes of illustration, consider for example, a certain hobby or sport gains popularity, such as professional bass fishing becoming popular in a certain region. Fans of professional bass fishing may start to list information associated with professional bass fishing, for example, fans may list professional bass fishers in a table in a spreadsheet, and may include other data in the table, such as favorite lures, boat names, pole types, boats, etc. After an Nth time of seeing data related to professional bass fishing, a service may record the data as a new fill series, such that when a search is made in the future using one or more pieces of profession bass fishing data, an autosuggestion 215 derived from the entered professional bass fishing data may be provided. The method 900 may end at OPERATION 990.

Figure 10:
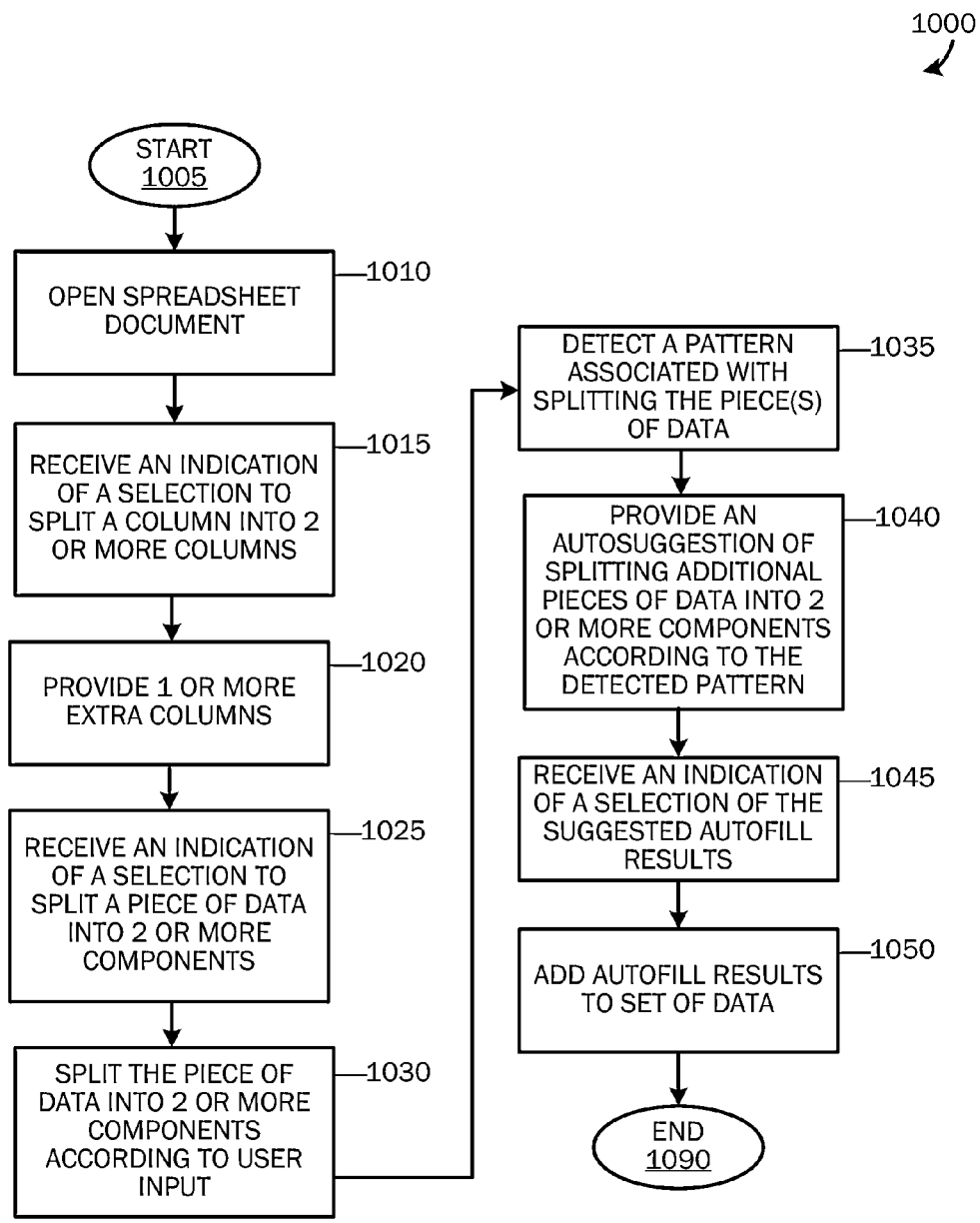
FIG. 10 shows one embodiment of a method for splitting data into two or more components between two or more columns and autosuggesting autofill results.

Referring now to FIG. 10, a flow chart illustrating a method 1000 for splitting data into two or more components between two or more columns and autosuggesting autofill results according to an embodiment is provided. The method 1000 may start at OPERATION 1005, and may proceed to OPERATION 1010, where a spreadsheet 106 document (e.g., spreadsheet workbook) is opened for use in a spreadsheet application 104. At OPERATION 1015, an indication of a selection to split a column 502 into two or more columns may be received. For example, a user may select a split column command 508. The selection may include a selection of a number of extra columns to insert. At OPERATION 1020, one or more extra columns may be provided.

The method 1000 may proceed to OPERATION 1025, where an indication of a selection to split a piece of data 205 into two or more components (e.g., split a first and last name into two columns; split a first, middle, and last name into three columns; separate parts of an address; etc.) may be received. As described above with reference to FIGS. 5A-8C, various methods may be used to split a piece of data 205. For example, a user may start to type data 205 into an adjacent column (e.g., an extra column 502E provided when a column is split), may move pieces of data 205 via selectable and moveable tokens 705, or may split a piece of data 205 via a slider UI 805, etc. When the user commits to the split, at OPERATION 1030, the piece of data 205 may be split into the two or more components according to the user's input, and a split portion of the piece of data 205 may be moved to an adjacent column 502. If cells in the adjacent column already contain data 205, the split portion of the piece of data 205 may be combined with the data.

At OPERATION 1035, a pattern associated with splitting the piece of data 205 may be detected. For example, if a piece of data 205 is a first and last name in a cell in a table 405, and if the piece of data 205 (e.g., first and last name) is split into two columns, other pieces of data 205 in the same column of the table 405 may be determined to match a same pattern as the piece of data 205 (e.g., a first and last name). If a pattern is detected, at OPERATION 1040, an autosuggestion 215 to split the other pieces of data 205 in the column may be provided (e.g., an autosuggestion 215 to split any detected first and last names in the table 405 into two columns 502). At OPERATION 1045, an indication of a selection of the autosuggestion 215 may be received, and at OPERATION 1050, the autofill results may be added to the spreadsheet 106. The method 1000 may end at OPERATION 1090.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 11:
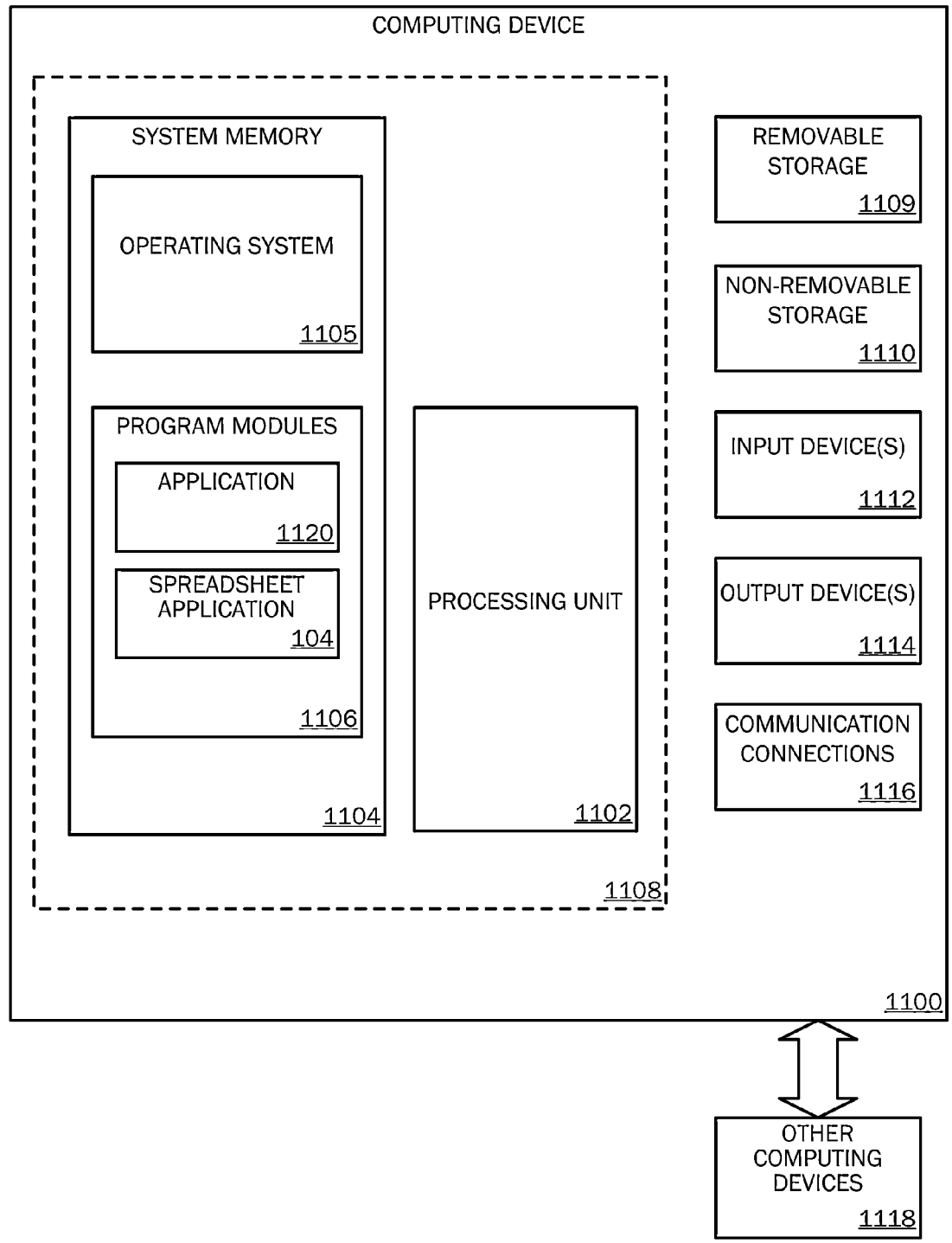
FIG. 11 is a block diagram illustrating one embodiment of the physical components of a computing device with which embodiments of the invention may be practiced.
Figure 12A:
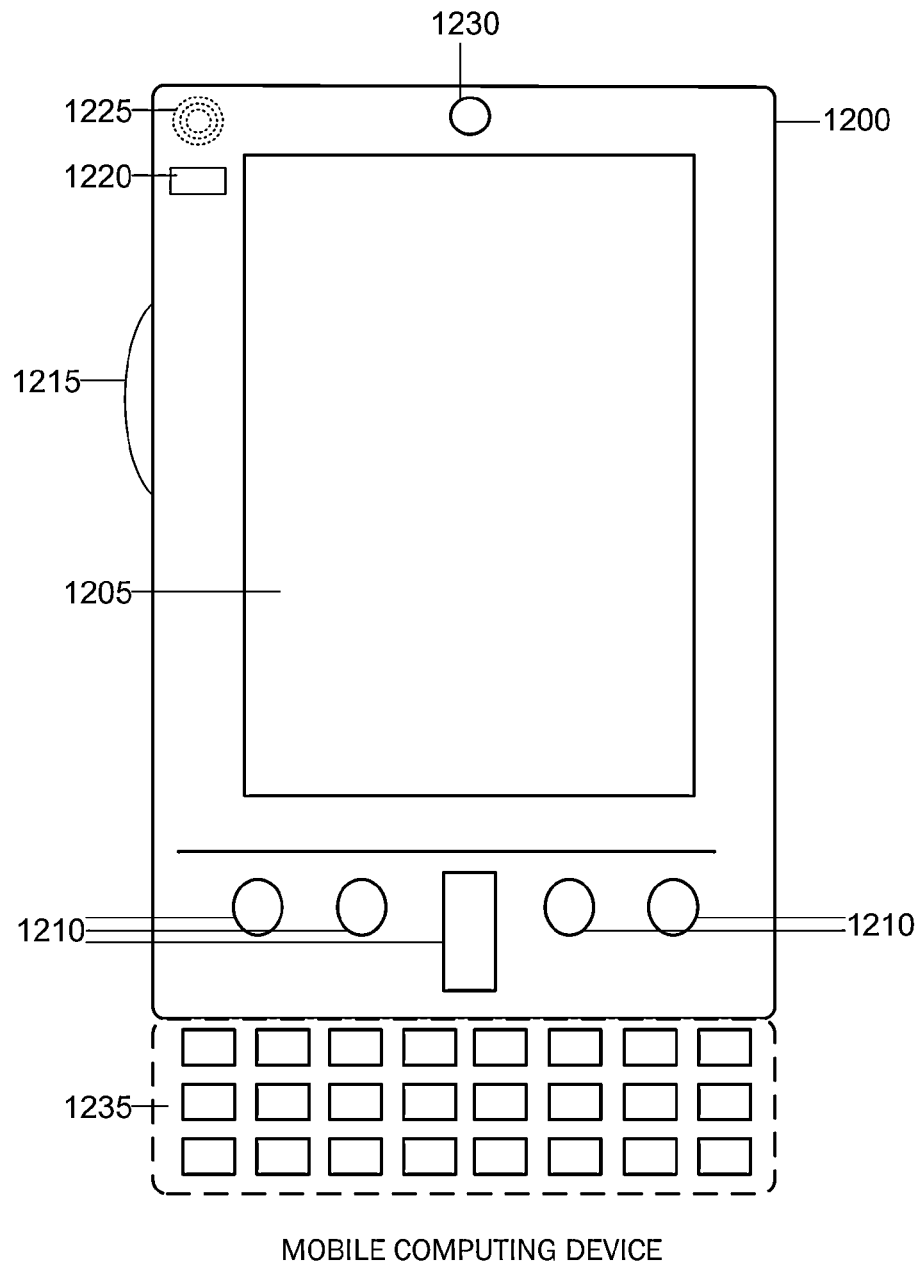
FIGS. 12A and 12B are simplified block diagrams of a mobile computing device with which embodiments of the present invention may be practiced.
Figure 12B:
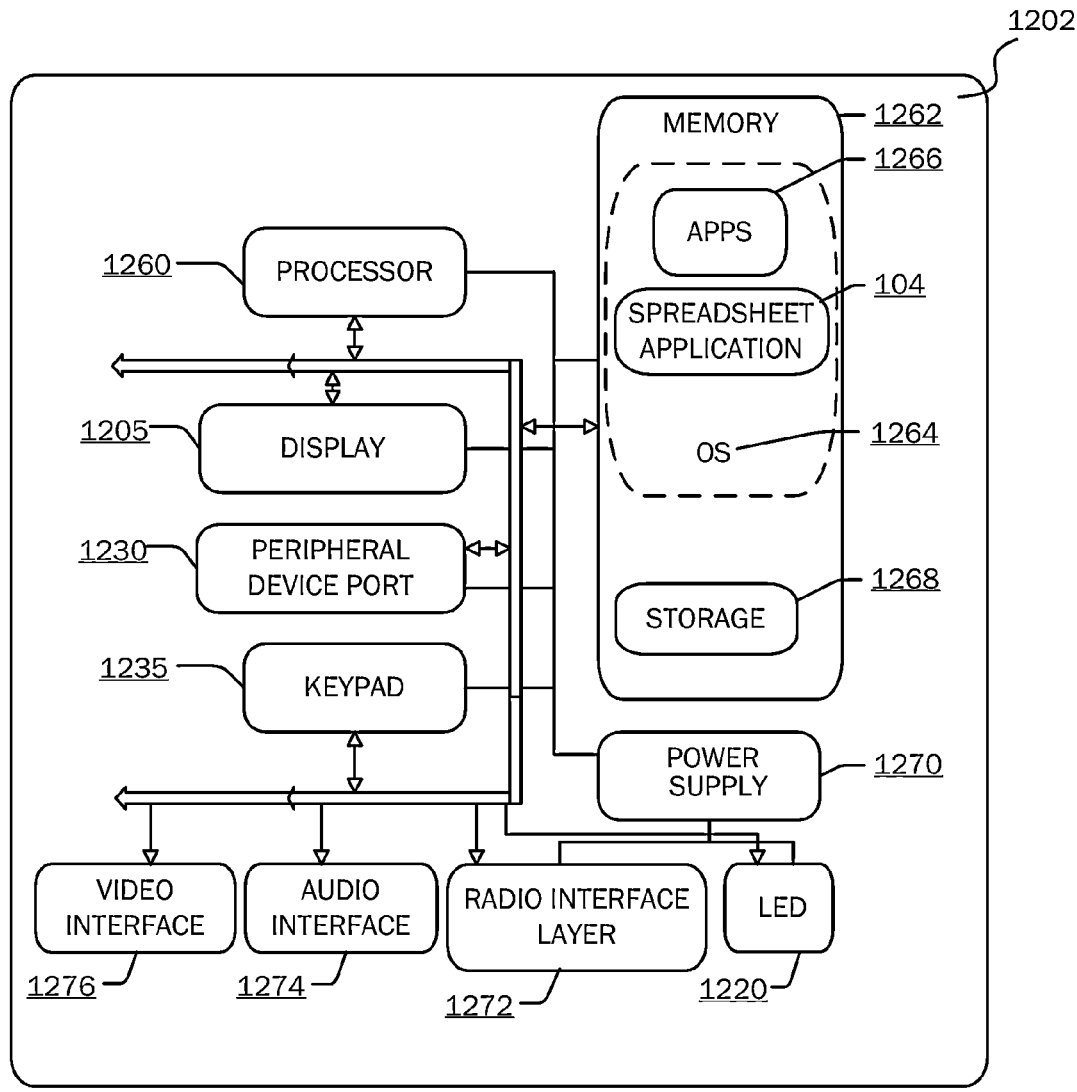
Figure 13:
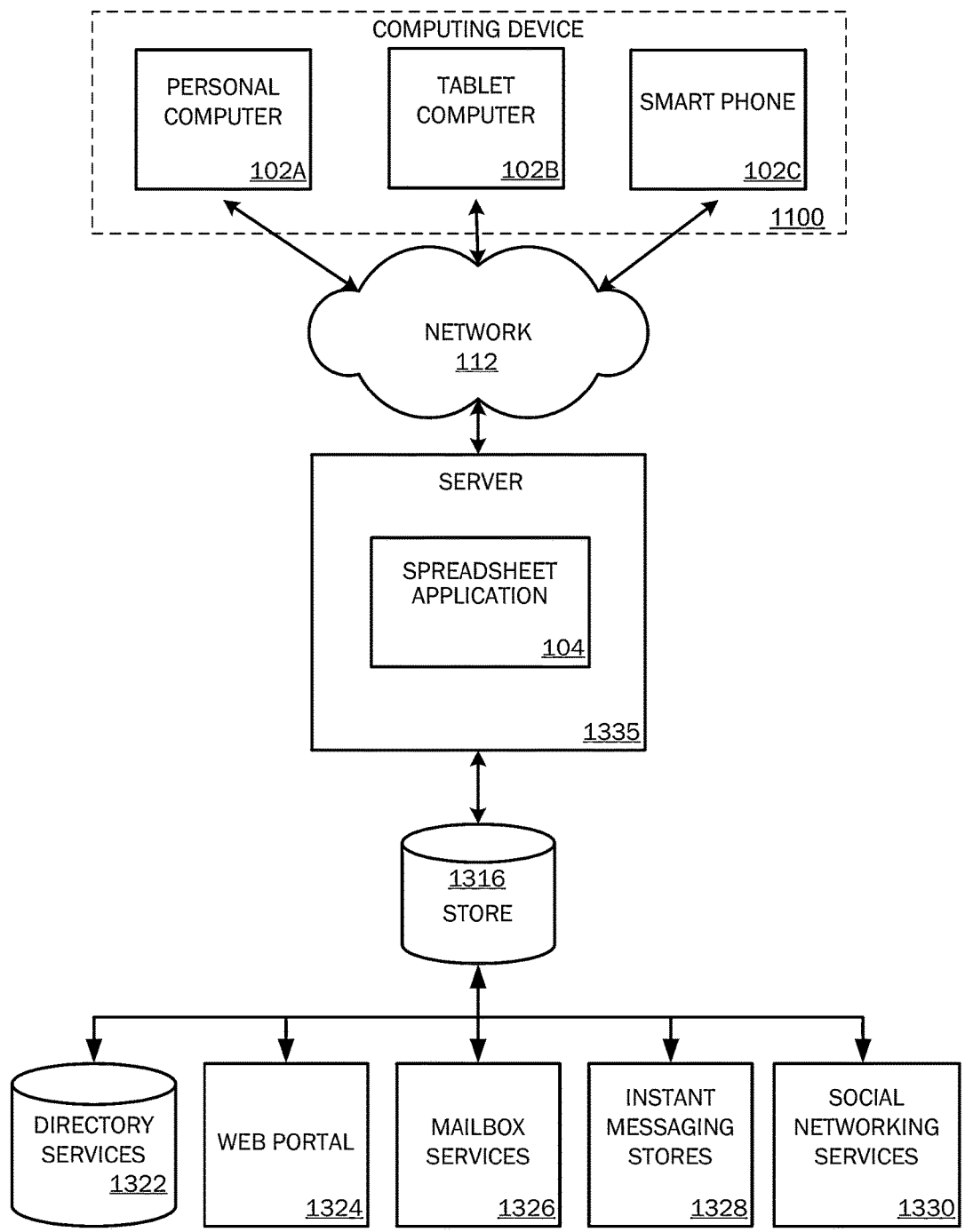
FIG. 13 is a simplified block diagram of a distributed computing system in which embodiments of the present invention may be practiced.

FIGS. 11-13 and the associated descriptions provide a discussion of a variety of operating environments in which embodiments of the invention may be practiced. However, the devices and systems illustrated and discussed with respect to FIGS. 11-13 are for purposes of example and illustration and are not limiting of a vast number of computing device configurations that may be utilized for practicing embodiments of the invention, described herein.

FIG. 11 is a block diagram illustrating physical components (i.e., hardware) of a computing device 1100 with which embodiments of the invention may be practiced. The computing device components described below may be suitable for the computing devices described above including the personal computer 102a, the tablet computer 102b, and the smart phone 102c. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the spreadsheet application 104. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the software applications 1120 may perform processes including, but not limited to, one or more of the stages of the method 900, 1000 illustrated in FIGS. 9 and 10. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the software applications 1120 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 12A and 12B illustrate a mobile computing device 1200, for example, a mobile telephone, a smart phone, a tablet personal computer, a laptop computer, and the like, with which embodiments of the invention may be practiced. With reference to FIG. 12A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one embodiment of a mobile computing device. That is, the mobile computing device 1200 can incorporate a system (i.e., an architecture) 1202 to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including software applications 1120 described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 13 illustrates one embodiment of the architecture of a system for providing smart fill functionality to one or more client devices, as described above. Content developed, interacted with, or edited in association with the spreadsheet application 104 may be stored in different communication channels or other storage types. For example, various documents may be stored using a directory service 1322, a web portal 1324, a mailbox service 1326, an instant messaging store 1328, or a social networking site 1330. The spreadsheet application 104 may use any of these types of systems or the like for enabling data utilization, as described herein. A server 1320 may provide the spreadsheet application 104 to clients. As one example, the server 1320 may be a web server providing the spreadsheet application 104 over the web. The server 1320 may provide the spreadsheet application 104 over the web to clients through a network 112. By way of example, the client computing device may be implemented as the computing device 1100 and embodied in a personal computer 102A, a tablet computer 102B, and/or a mobile computing device 102C (e.g., a smart phone). Any of these embodiments of the client computing device 102A-C may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for providing a suggestion of autofill results for a set of data, the method comprising:
    opening a spreadsheet;
    receiving a selection of a set of data in the spreadsheet;
    recognizing characteristics associated with the set of data, including searching an external data source based on contextual information within the spreadsheet that identify an intended use for the set of data, the contextual information including data in adjacent cells that is related to the set of data;
    determining whether the set of data comprises data in a series pattern; and
    in response to determining that the set of data comprises data in the series pattern:
    searching for potential autofill results based on the series pattern and the contextual information; and
    providing the potential autofill results for display as suggested autofill results in the spreadsheet.

2. The method of claim 1, further comprising:
    receiving an indication of a selection of a commit to the suggested autofill results; and adding the suggested autofill results as data in the spreadsheet.

3. The method of claim 1, wherein recognizing characteristics associated with the set of data comprises recognizing one or more of:
   outer limits associated with the set of data;
   a shape associated with the set of data; and
   size of the set of data.

4. The method of claim 1, wherein searching for potential autofill results comprises searching an external data source for a series pattern including the set of data.

5. The method of claim 4, wherein searching an external data source for a series including the set of data comprises searching one or more Internet data sources.

6. The method of claim 4, wherein searching an external data source for a series pattern including the set of data comprises searching one or more internal data stores associated with a corporation or organization.

7. The method of claim 6, wherein searching the one or more internal data stores associated with the corporation or organization includes providing permissions to access only data for which consent to publish has been given are searched for use as the potential autofill results.

8. The method of claim 4, wherein searching an external data source for a series pattern including the set of data connecting to an internal data service operable to comb internal data stores and determine relationships of data within them.

9. The method of claim 4, further comprising using contextual information in the set of data to search for a series pattern including the set of data.

10. A system for providing a suggestion of autofill results for a set of data, the system comprising:
    one or more processors; and
    a memory coupled to the one or more processors, the one or more processors operable to:
    open a spreadsheet;
    receive a selection of a set of data in the spreadsheet;
    recognize characteristics associated with the set of data, including searching an external data source based on contextual information within the spreadsheet that identify an intended used for the set of data, the contextual information including data in adjacent cells that is related to the set of data, wherein the characteristics comprise at least one of:
      outer limits associated with the set of data;
      a shape associated with the set of data; and
      size of the set of data;
    determine whether the received data comprises data in a series pattern; and
    in response to determining that the set of data comprises data in a series pattern:
      search for potential autofill results based on the series pattern and the contextual information in a data source; and
      provide the potential autofill results for display in the spreadsheet as suggested autofill results.

11. The system of claim 10, wherein the processor is further operable to:
    receive an indication of a selection of a commit to the suggested autofill results; and
    add the suggested autofill results as data in the spreadsheet.

12. The system of claim 10, wherein the processor, in searching for potential autofill results in a data source, is operable to search one or more Internet data sources.

13. The system of claim 10, wherein the processor, in searching for potential autofill results in a data source, is operable to search one or more internal data stores associated with a corporation or organization.

14. The system of claim 10, wherein the processor, in searching for potential autofill results in a data source, is operable to search an internal data service operable to comb internal data stores and determine relationships of data within them.

15. The system of claim 10, wherein the processor is further operable to use contextual information in the set of data to search for a series pattern including the received set of data.

16. The system of claim 10, wherein the processor is further operable to:
    determine a set of data input by a user is a new series pattern; and
    store the set of data as a series that can be used as future potential autofill results.

17. A computer readable storage media, implemented in hardware, for providing a suggestion of autofill results for a group of cells, the computer readable storage media including instructions, which when executed by a processing unit, perform the steps of:
    receiving a selection of the group of cells in a spreadsheet;
    recognizing characteristics associated with the group of cells, including searching an external data source based on contextual information within the spreadsheet to identify an intended use for the group of cells, the contextual information including data in adjacent cells that is related to the set of data;
    determining whether the group of cells comprises data in a series pattern; and
    in response to determining that the group of cells comprises data in the series pattern:
    searching for potential autofill results; and
    providing the potential autofill results for display in the spreadsheet as suggested autofill results.

18. The computer readable storage media of claim 17, wherein searching for potential autofill results comprises searching an external data source for a series pattern including the received group of cells.

19. The computer readable storage media of claim 18, wherein searching an external data source for a series including the received group of cells comprises searching one or more Internet data sources.

20. The computer readable storage media of claim 18, wherein searching an external data source for a series pattern including the received group of cells comprises searching one or more internal data stores associated with a corporation or organization.

* * * * *